(12) United States Patent
Osada

(10) Patent No.: US 7,249,362 B2
(45) Date of Patent: Jul. 24, 2007

(54) DISK CHUCKING MECHANISM AND DISK DRIVE DEVICE WITH INCREASED POSITIONAL ACCURACY

(75) Inventor: Yasuo Osada, Saitama (JP)

(73) Assignee: Sony Corporation, Tokyo (JP)

( * ) Notice: Subject to any disclaimer, the term of this patent is extended or adjusted under 35 U.S.C. 154(b) by 292 days.

(21) Appl. No.: 10/930,768

(22) Filed: Sep. 1, 2004

(65) Prior Publication Data

US 2005/0060733 A1    Mar. 17, 2005

(30) Foreign Application Priority Data

Sep. 16, 2003    (JP)    ............................. 2003-322790

(51) Int. Cl.
*G11B 17/028*    (2006.01)
(52) U.S. Cl. ..................................... 720/714
(58) Field of Classification Search ........ 720/706–714; 369/75.21; 360/99.05
See application file for complete search history.

(56) References Cited

U.S. PATENT DOCUMENTS

2005/0010941 A1*    1/2005    Osada et al. ................ 720/703

FOREIGN PATENT DOCUMENTS

| JP | 4-132641 | 12/1992 |
|---|---|---|
| JP | 2003-217202 | 7/2003 |
| JP | 2005-4803 | 1/2005 |

\* cited by examiner

*Primary Examiner*—Craig A. Renner
(74) *Attorney, Agent, or Firm*—Oblon, Spivak, McClelland, Maier & Neustadt, P.C.

(57) ABSTRACT

A chucking pulley clamps and chucks a recording medium in coaction with a disk table. The chucking pulley has a rotary slide knob and is rotatably supported on a support arm. The support arm has first and second lifting/lowering pins. A holder is mounted on the support arm for pressing the chucking pulley toward the disk table while in contact with an end of the rotary slide knob when the recording medium is in rotation. A spring is resiliently held against the first lifting/lowering pins. Moving members move the chucking pulley toward and away from the disk table. The moving members have retainers for retaining the first lifting/lowering pins in an acting position when the recording medium is chucked. The first lifting/lowering pins retained in the acting position deform the spring to bias the support arm and the holder toward the disk table.

4 Claims, 27 Drawing Sheets

F I G. 1 9
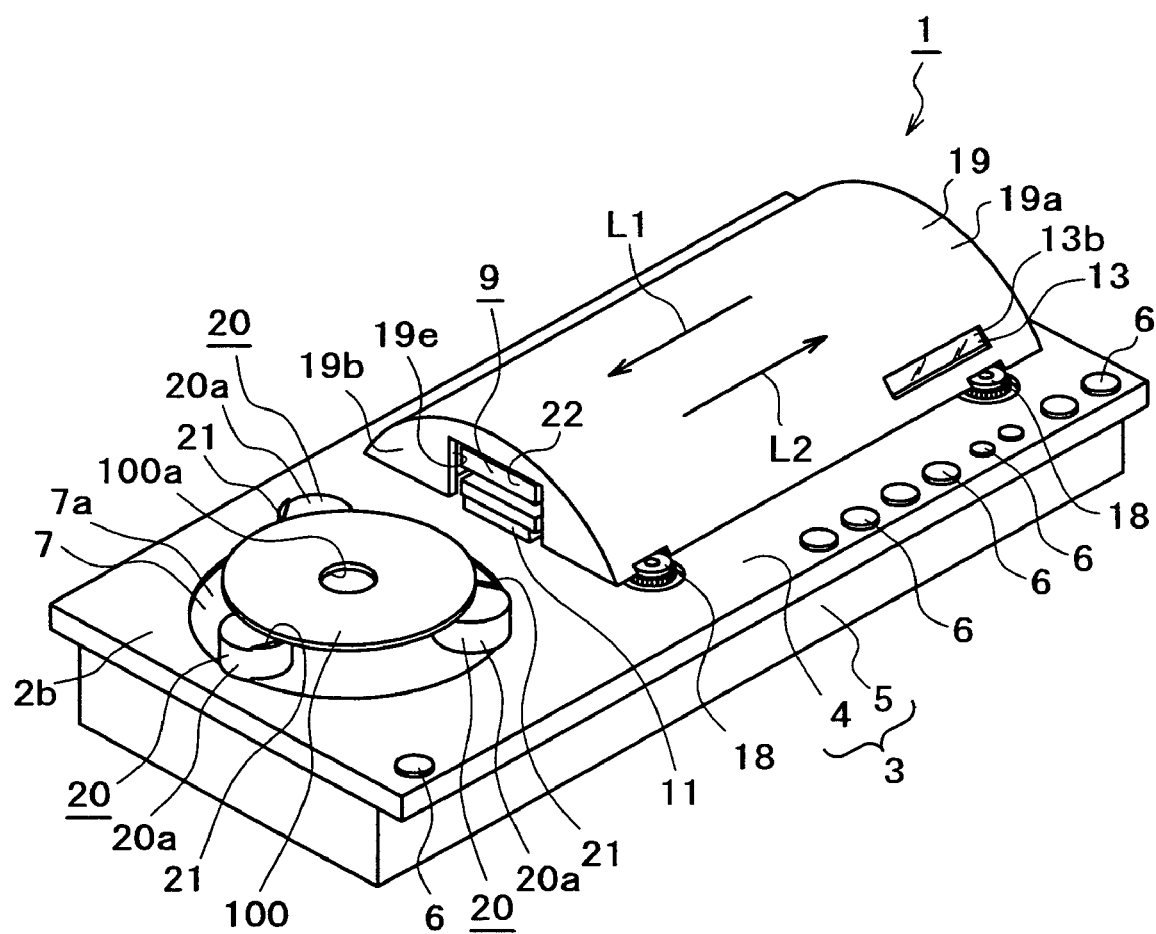

DISK CHUCKING MECHANISM AND DISK DRIVE DEVICE WITH INCREASED POSITIONAL ACCURACY

BACKGROUND OF THE INVENTION

The present invention relates to a disk chucking mechanism and a disk drive device, and more particularly to the art of increasing the positional accuracy of various components to provide a low-profile structure for such a disk chucking mechanism and a disk drive device.

There are known disk drive devices for recording an information signal on and reproducing an information signal from a disk-shaped recording medium such as an optical disk, or a magneto-optical disk. The known disk drive devices include a disk drive device of the type a disk chucking mechanism having a disk table for mounting a disk-shaped recording medium thereon and a chucking pulley for gripping and chucking the disk-shaped recording medium in coaction with the disk table. For details, reference should be made to Japanese Patent Laid-open No. Hei 6-180913 and Japanese Patent Laid-open No. Hei 9-265705, for example.

The disk drive device operates as follows: When a disk-shaped recording medium that is chucked by the disk table and the chucking pulley is rotated upon rotation of the disk table, an optical pickup that moves in a radial direction of the disk-shaped recording medium emits and applies a laser beam to the disk-shaped recording medium to record an information signal on or reproduce an information signal from the disk-shaped recording medium.

FIGS. 25–28 of the accompanying drawings show a conventional disk chucking mechanism a. As shown in FIGS. 25 and 26, the disk chucking mechanism a has a disk table b and a chucking pulley c.

The disk table b is fixed to a motor shaft d of a spindle motor (not shown), and has a positioning knob e projecting upwardly from the center of the disk table b. The positioning knob e may comprise the upper end of the motor shaft d which projects upwardly from the disk table b.

The spindle motor is housed in a base casing f.

The chucking pulley c has a shank g and a flange h and a presser i that are disposed respectively on upper and lower ends of the shank g. The flange h and the presser i extend outwardly from the respective upper and lower ends of the shank g.

The chucking pulley c has a downwardly open central recess defined therein and a downwardly projecting positioning tube j disposed centrally in the recess. The positioning tube j has a guide hole k defined in a lower end thereof and having a diameter progressively smaller in the upward direction, and a vertically extending insertion hole 1 joined to the upper end of the guide hole k.

The chucking pulley c has a rotary slide knob m projecting upwardly from the center of the upper surface thereof.

The chucking pulley c is rotatably supported in a support hole o that is defined in an end of a horizontally long support arm n. Specifically, the shank g of the chucking pulley c is inserted in the support hole o, and the chucking pulley c is retained on the support arm n by the flange h against dislodgment from the support arm n.

Vertical displacement pins p that are horizontally spaced from each other project laterally from the other end of the support arm n. A holder spring q is mounted on the support arm n and has a free end pressing downwardly the rotary slide knob m on the chucking pulley c.

The vertical displacement pins p slidably engage in respective cam slots s defined in a cam plate r. Each of the cam slots s has an upper horizontal section t, a slanted section u, and a lower horizontal section v which are defined successively downwardly. The cam plate r is movable horizontally.

The vertical displacement pins p also slidably engage in respective vertically long guide holes defined in a guide means (not shown).

The disk chucking mechanism a operates as follows: A disk tray x with a disk-shaped recording medium w placed thereon is moved horizontally, and then stopped when a through hole y defined in the disk tray x is positioned above the disk table b.

Then, the disk tray x is moved downwardly, or the disk table b is moved upwardly, placing the disk-shaped recording medium w on the disk table b. The disk tray x is spaced downwardly from the disk-shaped recording medium w that has been placed on the disk table b.

Then, the cam plate r is moved horizontally to cause the vertical displacement pins p to move relatively from the upper horizontal sections t through the slanted sections u into the lower horizontal sections v of the cam slots s. As the vertical displacement pins p also slidably engage in the respective vertically long guide holes, the support arm n is moved downwardly, and so is the chucking pulley c. The presser i of the chucking pulley c is pressed against the disk-shaped recording medium w by the holder spring q. The disk-shaped recording medium w is now gripped and chucked on the disk table b by the disk table b and the chucking pulley c.

When the chucking pulley c is moved downwardly, the positioning knob e of the disk table b slides into the guide hole k in the positioning tube j and is inserted into the insertion hole l. The disk table b and the chucking pulley c are now centrally aligned with each other vertically, so that the chucking pulley c is positioned with respect to the disk table b.

The disk-shaped recording medium w thus chucked in place is then rotated in unison with the chucking pulley c by the disk table b that is rotated by the spindle motor. The chucking pulley c is rotated while the rotary slide knob m is being held by the holder spring q and the shank g, the flange h, and the presser i are being spaced from the support arm n. The disk table b and the disk-shaped recording medium w are rotated out of contact with other components.

Since the disk table b, the chucking pulley c, and the disk-shaped recording medium w are rotated out of contact with other components, the disk-shaped recording medium w is prevented from vibrating due to contact with other components. Since the disk-shaped recording medium w is not vibrated, the optical pickup is capable of operating stably in its focus servo and tracking servo processes for thereby preventing errors from occurring when recording an information signal on and reading an information signal from the disk-shaped recording medium w.

However, the conventional disk chucking mechanism a is problematic in that the support arm n has a poor positional accuracy because the holder spring q presses the chucking pulley c against the disk-shaped recording medium w.

The positional accuracy of the support arm n will be described below with reference to FIG. 25 of the accompanying drawings. FIG. 25 shows the support arm n as being exaggeratedly inclined in order to explain the positional accuracy of the support arm n.

The vertical displacement pins p and the cam slots s in the cam plate r suffer positional accuracy variations. It is assumed that the sum of vertical accuracies of the vertical displacement pin p that is positioned remoter from the chucking pulley c and the cam slot s receiving that vertical displacement pin p is represented by P1, the sum of vertical accuracies of the vertical displacement pin p that is positioned closer to the chucking pulley c and the cam slot s receiving that vertical displacement pin p by P2, the distance between the vertical displacement pins p by L1, and the distance between the vertical displacement pin p that is positioned remoter from the chucking pulley c and the center of the chucking pulley c by L2.

Since the support arm n is positionally displaced vertically due to changes in the biasing force of the holder spring q that is used in the disk chucking mechanism a, the chucking pulley c cannot provide a reference for the vertical positional accuracy of the support arm n. As the sum H1 of the accuracies of the vertical displacement pins p is expressed as H1=P1+P2, the vertical accuracy H2 of the support arm n at the central position of the chucking pulley c is given by the following equation:

$$H2 = H1 \times L2/L1 = (P1+P2) \times L2/L1 \quad (1)$$

Usually, the vertical displacement pins p are positioned radially outwardly of the outer circumferential edge of the disk-shaped recording medium w for the purpose of making the disk chucking mechanism a lower in profile, and the distance L1 between the vertical displacement pins p is minimized in order to reduce the size of the outer contour of the disk chucking mechanism a. Accordingly, the distance L2 tends to be several times greater than the distance L1, and the sum H2 also tends to be several times greater than the sum H1, with the result that the positional accuracy of the support arm n at its distal end is very poor.

Inasmuch as the positional accuracy of the support arm n at its distal end, i.e., the positional accuracy of the support arm n at its portion supporting the chucking pulley c, it is necessary to increase the axial length of the shank g in order to prevent the chucking pulley c from contacting other components when the chucking pulley c is in rotation. However, an increase in the axial length of the shank g presents an obstacle to efforts to construct the disk chucking mechanism a in a low-profile configuration.

The angular accuracy of the support arm n will be described below.

As shown in FIG. 25, if the support arm n is inclined an angle θc to the horizontal plane, then the angle θc is expressed as Tan θc=H1/L1. If the chucking pulley c has a diameter Dp, then a displacement Δh of the chucking pulley c at its central position is given by the following equation:

$$\Delta h = Dp/2 \cdot \mathrm{Tan}\theta c = H1 \times Dp/2L1 \quad (2)$$
$$= (P1 + P2) \times Dp/2L1$$

When the disk-shaped recording medium w is chucked in place on the disk table b, if the support arm n is inclined to the horizontal plane, then the support arm n and a portion of the chucking pulley c are liable to contact each other. In an attempt to avoid such contact, it is necessary to elongate the shank g axially in view of the displacement Δh. While the disk-shaped recording medium w is not being chucked in place, the chucking pulley c can move freely with respect to the support arm n by a distance which is made greater as the shank g is axially elongated. The increased axial length of the shank g, however, prevents the disk chucking mechanism a from being lower in profile.

As shown in FIG. 26 of the accompanying drawings, the flange h of the chucking pulley c needs to be spaced from the support arm n by a certain distance C1, and the presser i of the chucking pulley c needs to be spaced from the support arm n by a certain distance C2 in order to avoid contact between the chucking pulley c and the support arm n when the chucking pulley c is in rotation. If the distances C1, C2 are to be maintained and at the same time the disk chucking mechanism a is to be of a low profile, then it is desirable to reduce the thickness of the support arm n.

However, there is a certain limitation on efforts to reduce the thickness of the support arm n because the support arm n has to have a certain level of rigidity to achieve desired mechanical strength. As a result, the axial length of the shank g has to be increased to maintain the distances C1, C2. Accordingly, the thickness of the chucking pulley c is also increased, and the chucking pulley c moves vertically an increased distance, making it difficult to make the disk chucking mechanism a lower in profile.

The relationship between the size of the support hole o in the support arm n and the thickness of the disk chucking mechanism a will be described below with reference to FIG. 26.

The disk table b and the chucking pulley c need to be centrally aligned with each other in order to reduce vibrations caused when they are in rotation. The centers of the disk table b and the chucking pulley c are brought into accurate alignment with each other by inserting the positioning knob e of the disk table b into the positioning tube j of the chucking pulley c.

At this time, since the chucking pulley c is freely movable in the support hole o in the support arm n, the positioning tube j has the guide hole k, and the positioning knob e is guided by the guide hole k to move reliably into the insertion hole 1 when the chucking pulley c is moved downwardly.

If the positioning knob e is located within the diameter (introducing range) Dθ of the lower end of the guide hole k, then the positioning knob e can be inserted into the insertion hole 1. If the vertical length Hc of the guide hole k is constant, then the introducing range Dθ can be increased by reducing the introducing angle θ of the guide hole k. However, if the introducing angle θ is reduced, then the ability of the positioning knob e to slide into the guide hole k is also reduced. Therefore, the introducing angle θ is limited to a certain range.

For reliably inserting the positioning knob e into the insertion hole 1, it is necessary to keep the introducing angle θ constant and increase the introducing range Dθ. If the introducing range Dθ is increased, then the vertical length Hc of the guide hole k is increased accordingly, resulting in an increase in the thickness of the disk chucking mechanism a.

The introducing range Dθ depends upon the magnitude of the outside diameter of the shank g of the chucking pulley c with respect to the support hole o in the support arm n. For example, if the outside diameter of the shank g is small with respect to the support hole o, then since the shank g can move freely in the support hole o within a large range, the introducing range Dθ is large. Conversely, if the outside diameter of the shank g is large with respect to the support hole o, then since the shank g can move freely in the support hole o within a small range, the introducing range Dθ is small.

To avoid contact between the support arm n and the chucking pulley c while the chucking pulley c is in rotation, the diameter of the shank g needs to be of a certain value or less with respect to the support hole o. Therefore, the introducing range Dθ needs to be of a certain value or more, and the vertical length Hc of the guide hole k is large.

The introducing range Dθ also depends upon the positional accuracy of the support arm n. For example, when the support arm n is moved vertically, if the support arm n is displaced radially of the support hole o, then the center of the chucking pulley c is displaced accordingly out of alignment with the center of the disk table b. Therefore, it is necessary to increase the introducing range Dθ.

As the introducing range Dθ becomes larger, the vertical length Hc of the guide hole k increases, and the thickness of the disk chucking mechanism a increases.

SUMMARY OF THE INVENTION

It is therefore an object of the present invention to provide a disk chucking mechanism and a disk drive device which will solve the above problems and have a low-profile structure achieved by increasing the positional accuracy of various components thereof.

To achieve the above object, there is provided in accordance with the present invention a disk chucking mechanism including a spindle motor having a motor shaft, a disk table fixed to the motor shaft of the spindle motor for rotation in response to energization of the spindle motor, a chucking pulley for clamping and chucking a disk-shaped recording medium in coaction with the disk table, the chucking pulley having a rotary slide knob projecting away from the disk table, a support arm extending in a direction perpendicular to an axial direction of the chucking pulley, the chucking pulley being rotatably supported on an end of the support arm in a longitudinal direction thereof, a first lifting/lowering pin and a second lifting/lowering pin which are mounted on an opposite end portion of the support arm and spaced from each other in the longitudinal direction, a holder fixedly mounted on the support arm for pressing the chucking pulley toward the disk table while being held in contact with a distal end of the rotary slide knob when the disk-shaped recording medium is in rotation, a bias spring having a portion mounted on the support arm and another portion resiliently held against the first lifting/lowering pin, and moving means for moving the chucking pulley toward and away from the disk table, the first lifting/lowering pin and the second lifting/lowering pin being movably supported by the moving means, wherein the moving means has a retainer for retaining the first lifting/lowering pin in an acting position when the disk-shaped recording medium is chucked, and wherein the first lifting/lowering pin retained in the acting position by the retainer elastically deforms the bias spring to bias the support arm and the holder to move toward the disk table.

With the above disk chucking mechanism, when the disk-shaped recording medium is chucked, the support arm and the holder are biased to move toward the disk table by the bias spring. The positional accuracy of the support arm is increased, allowing the disk chucking mechanism to be constructed in a lower-profile configuration.

To achieve the above object, there is also provided in accordance with the present invention a disk chucking mechanism including a casing having a spindle motor mounted therein and having a motor shaft, a disk table fixed to the motor shaft of the spindle motor for rotation in response to energization of the spindle motor, the disk table having a positioning protrusion centrally thereon, a chucking pulley for clamping and chucking a disk-shaped recording medium in coaction with the disk table, the chucking pulley having a positioning tube for receiving the positioning protrusion inserted therein, a support arm extending in a direction perpendicular to an axial direction of the chucking pulley, the chucking pulley being rotatably supported on the support arm, and moving means for moving the chucking pulley toward and away from the disk table, the support arm being movably supported by the moving means, wherein the support arm has a limit element, and wherein the casing has a limit member for limiting the limit element for preventing the support arm from moving in a direction perpendicular to the axial direction of the chucking pulley and perpendicular to a longitudinal direction of the support arm.

With the above disk chucking mechanism, when the chucking pulley moves toward and away from the disk table, the distance that the support arm moves in the direction perpendicular to the axial direction of the chucking pulley and perpendicular to the longitudinal direction of the support arm is reduced. When the positioning protrusion of the disk table is inserted into the positioning tube of the chucking pulley, any positional misalignment between the center of the disk table and the center of the chucking pulley is reduced. As the diameter of the opening of the positioning tube of the chucking pulley is reduced, the length of the positioning tube is also reduced, making the disk chucking mechanism lower in profile accordingly.

To achieve the above object, there is also provided in accordance with the present invention a disk drive device having a spindle motor having a motor shaft, a disk table fixed to the motor shaft of the spindle motor for rotation in response to energization of the spindle motor, and a chucking pulley for clamping and chucking a disk-shaped recording medium in coaction with the disk table, the chucking pulley having a rotary slide knob projecting away from the disk table, wherein an information signal is recorded on and reproduced from the disk-shaped recording medium which is chucked by the disk table and the chucking pulley, the disk drive device including a support arm extending in a direction perpendicular to an axial direction of the chucking pulley, the chucking pulley being rotatably supported on an end of the support arm in a longitudinal direction thereof, a first lifting/lowering pin and a second lifting/lowering pin which are mounted on an opposite end portion of the support arm and spaced from each other in the longitudinal direction, a holder fixedly mounted on the support arm for pressing the chucking pulley toward the disk table while being held in contact with a distal end of the rotary slide knob when the disk-shaped recording medium is in rotation, a bias spring having a portion mounted on the support arm and another portion resiliently held against the first lifting/lowering pin, moving means for moving the chucking pulley toward and away from the disk table, the first lifting/lowering pin and the second lifting/lowering pin being movably supported by the moving means, wherein the moving means has a retainer for retaining the first lifting/lowering pin in an acting position when the disk-shaped recording medium is chucked, and wherein the first lifting/lowering pin retained in the acting position by the retainer elastically deforms the bias spring to bias the support arm and the holder to move toward the disk table.

With the above disk drive device, when the disk-shaped recording medium is chucked, the support arm and the holder are biased to move toward the disk table by the bias spring. The positional accuracy of the support arm is increased, allowing the disk drive device to be constructed in a lower-profile configuration.

To achieve the above object, there is further provided in accordance with the present invention a disk drive device having a casing having a spindle motor mounted therein and having a motor shaft, a disk table fixed to the motor shaft of the spindle motor for rotation in response to energization of the spindle motor, the disk table having a positioning protrusion centrally thereon, and a chucking pulley for clamping and chucking a disk-shaped recording medium in coaction with the disk table, the chucking pulley having a positioning tube for receiving the positioning protrusion inserted therein, wherein an information signal is recorded on and reproduced from the disk-shaped recording medium which is chucked by the disk table and the chucking pulley, the disk drive device including a support arm extending in a direction perpendicular to an axial direction of the chucking pulley, the chucking pulley being rotatably supported on the support arm, and moving means for moving the chucking pulley toward and away from the disk table, the support arm being movably supported by the moving means, wherein the support arm has a limit element, and wherein the casing has a limit member for limiting the limit element for preventing the support arm from moving in a direction perpendicular to the axial direction of the chucking pulley and perpendicular to a longitudinal direction of the support arm.

With the above disk drive device, when the chucking pulley moves toward and away from the disk table, the distance that the support arm moves in the direction perpendicular to the axial direction of the chucking pulley and perpendicular to the longitudinal direction of the support arm is reduced. When the positioning protrusion of the disk table is inserted into the positioning tube of the chucking pulley, any positional misalignment between the center of the disk table and the center of the chucking pulley is reduced. As the diameter of the opening of the positioning tube of the chucking pulley is reduced, the length of the positioning tube is also reduced, making the disk drive device lower in profile accordingly.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIG. 19 is a perspective view showing the manner in which the centering of the disk-shaped recording medium is completed when the disk drive device is in operation, with the cover being omitted from illustration;

DESCRIPTION OF THE PREFERRED EMBODIMENT

Figure 1:
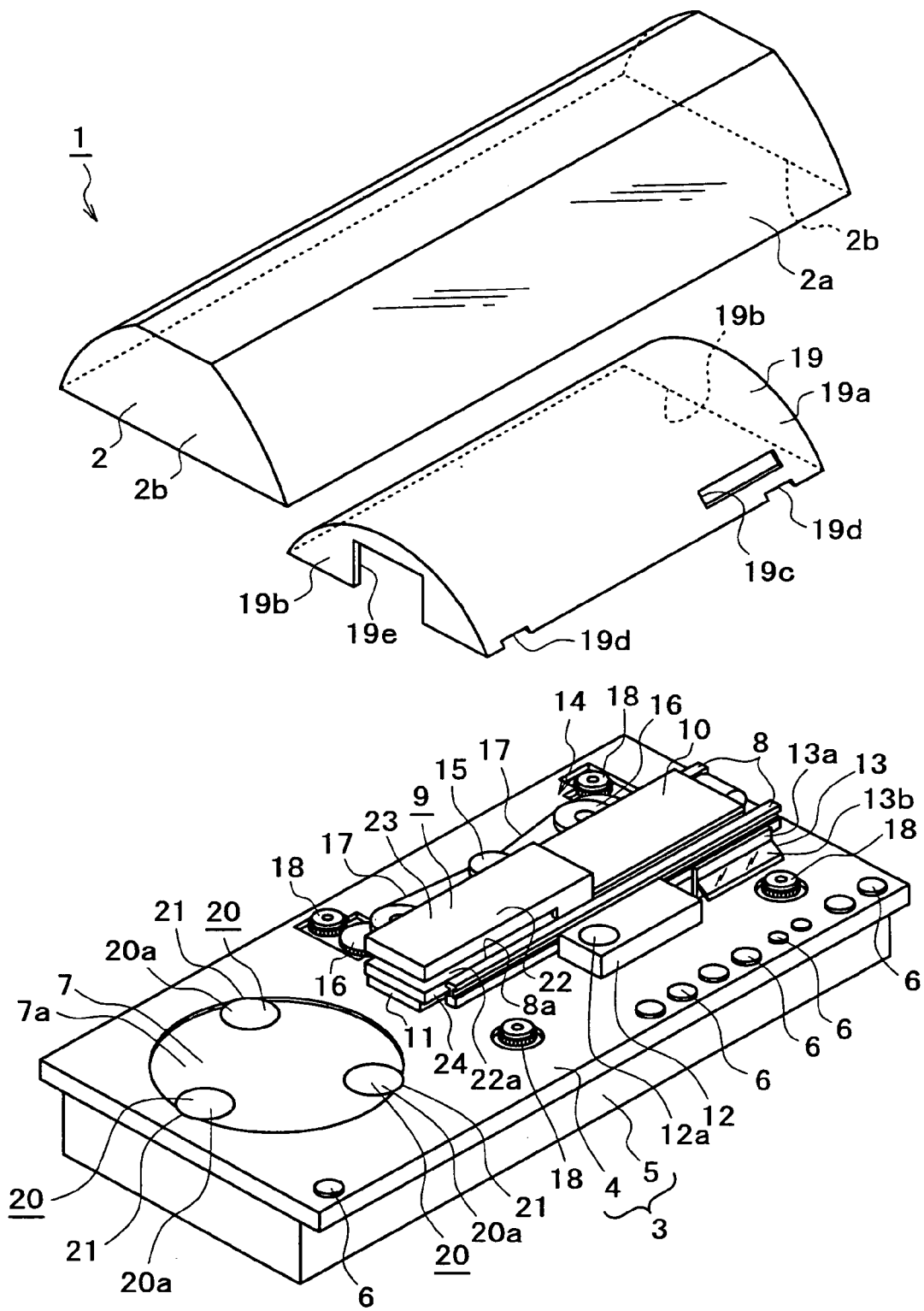
FIG. 1 is an exploded perspective view of a disk drive device according to an embodiment of the present invention, with a cover and an inner cover being shown as separated.
Figure 2:
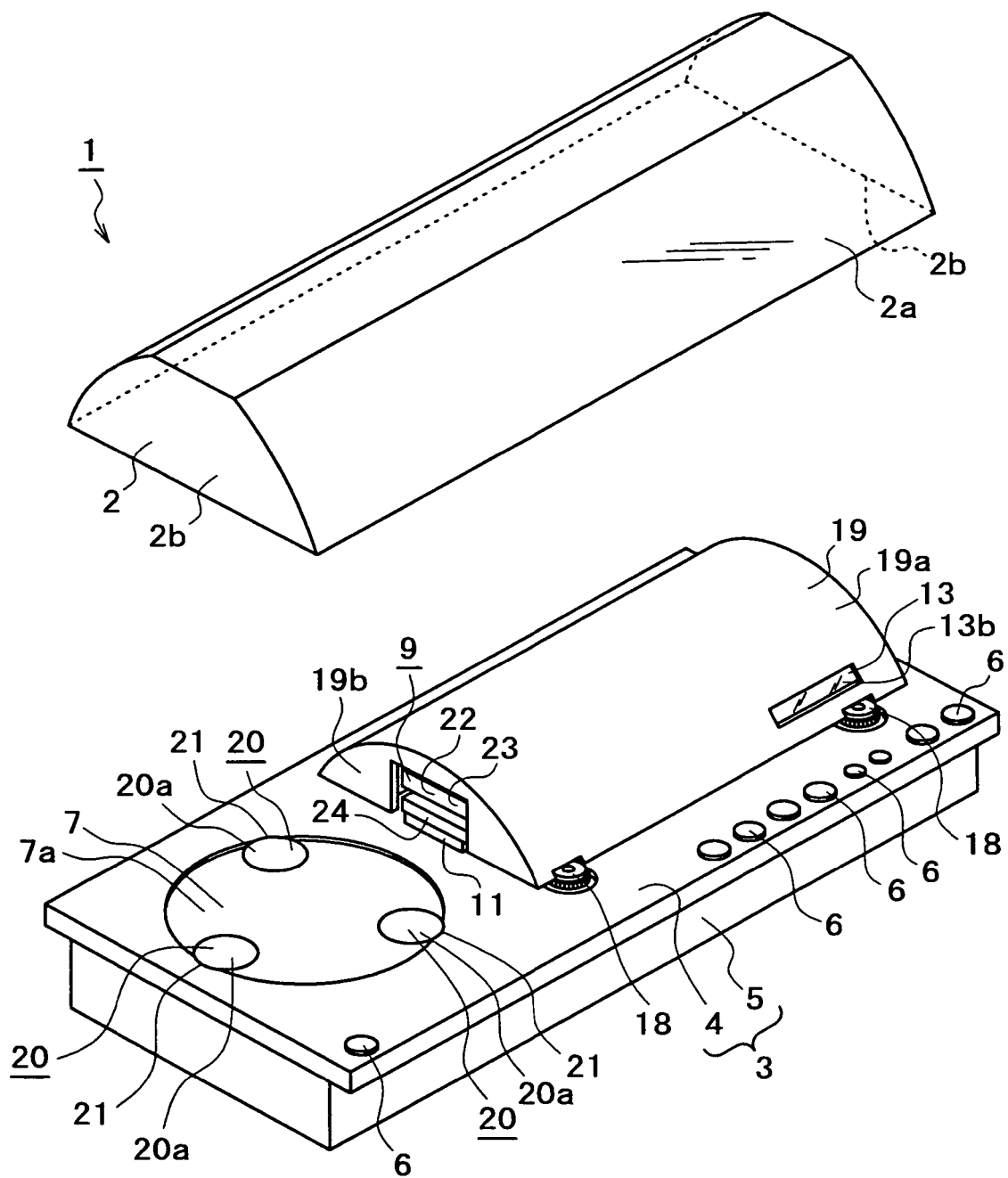
FIG. 2 is an exploded perspective view of the disk drive device with the cover being shown as separated.

As shown in FIGS. 1 and 2, a disk drive device 1 according to an embodiment of the present invention, which serves to record an information signal on and reproduce an information signal from a disk-shaped recording medium, comprises a cover 2, a base body 3, and various components and mechanisms mounted on the base body 3.

The cover 2 is made of a transparent material such as glass, synthetic resin, or the like, and has a substantially wagon-roofed shape that is open downwardly and elongate in one direction. The cover 2 comprises a hood 2a having a substantially arcuate transverse cross section and a pair of end walls 2b attached to the respective opposite longitudinal ends of the hood 2a, the hood 2a and the end walls 2b being integrally joined to each other.

In the description which follows, the longitudinal direction of the cover 2 is anteroposterior, and directions that are perpendicular to the longitudinal direction of the cover 2 are vertical and lateral.

As shown in FIGS. 1 and 2, the base body 3 comprises a base panel 4 and a bottom panel 5 positioned beneath and connected to the base panel 4. The bottom panel 5 is in the form of an upwardly open box that is elongate in the anteroposterior direction.

The base panel 4 supports a plurality of operational buttons 6 on a right side edge thereof which are spaced in the longitudinal direction. The operational buttons 6 include a power supply button for turning on and off a power supply, open and close buttons for opening and closing the cover 2, a play button for reproducing an information signal recorded on the disk-shaped recording medium, a pause button for pausing in a play mode, a stop button for stopping the play mode, and a volume button for changing the volume of sound reproduced from the disk-shaped recording medium.

A recording medium mount 7 is disposed on a front end of the base panel 4 in the longitudinal direction thereof.

The recording medium mount 7 is shaped as a shallow recess which is circular in shape as viewed in plan, and has a bottom surface serving as a disk mount surface 7a. The disk mount surface 7a comprises a gradual concave surface, e.g., a spherical surface.

The base body 3 houses therein a detecting means (not shown) for detecting a disk-shaped recording medium when it is placed on the disk mount surface 7a of the recording medium mount 7.

Two parallel guide rails 8 are mounted on the upper surface of the base panel 4 (see FIG. 1) of the base body 3. The guide rails 8 are positioned closely to the rear end of the base panel 4 and are elongate in the longitudinal direction of the base panel 4. The guide rails 8 have respective guide grooves defined longitudinally in their surfaces which confront each other.

A unit housing space 8a is provided between substantially half portions the guide rails 8 which are closer to the recording medium mount 7. A base unit 9 can be housed in the unit housing space 8a. A control board 10 for controlling operation of the base unit 9 is disposed between the guide rails 8 remotely from the recording medium mount 7 across the unit housing space 8a.

The base unit 9 and the control board 10 are mounted on a support base 11 positioned therebeneath. The support base 11 is elongate in the anteroposterior direction, and has guide pins (not shown) projecting laterally from their lateral sides. These guide pins slidably engage in the guide grooves in the guide rails 8 for guiding the support base 11 to move in the anteroposterior direction along the guide rails 8. A rack (not shown) is disposed on the right side surface of the support base 11.

A unit actuator 12 is disposed on the base panel 4 on the right side of the right guide rail 8. The unit actuator 12 comprises a drive motor 12a and a train of speed reduction gears (not shown) which can be rotated by the drive power transmitted from the drive motor 12a. The train of speed reduction gears includes a final gear held in mesh with the rack of the support base 11. When the drive motor 12a is energized, the drive power thereof is transmitted through the train of speed reduction gears to the rack of the support base 11, moving the support base 11, the base unit 9, and the control board 10 in unison with each other in a direction along the guide rails 8 which depends on the direction in which the drive shaft of the drive motor 12a rotates.

A display driver 13 is mounted on the base panel 4 behind the unit actuator 12. The display driver 13 comprises a control circuit board 13a and a display 13b for displaying operation statuses of various components of the disk drive device 1.

A cover actuator 14 is disposed on the base panel 4 on the left side of the left guide rail 8. The cover actuator 14 comprises a displacement motor 15 and a train of speed reduction gears 16 which can be rotated by the drive power transmitted from the displacement motor 15. The speed reduction gears 16 are divided into groups positioned forward and rearward of the displacement motor 15.

Pulleys (not shown) are connected to the displacement motor 15 and the speed reduction gears 16, respectively, and belts 17 are trained around those pulleys. When the displacement motor 15 is energized, the drive power thereof is transmitted through the belts 17 to the train of speed reduction gears 16, which are rotated synchronously in the same direction depending on the direction in which the drive shaft of the movement motor 15 rotates.

Gear assemblies 18 are rotatably supported on the base panel 4. Specifically, two gear assemblies 18 are disposed on a left side area of the base panel 4, and two gear assemblies 18 are disposed on a right side area of the base panel 4. Each of the gear assemblies 18 comprises an upper roller 18a and a lower gear 18b positioned coaxially beneath the upper roller 18a. The gear assemblies 18 that are disposed on the left side area of the base panel 4 have their gears 18b held in mesh with the final gears of the train of speed reduction gears 16.

With the cover 2 mounted on the base panel 4, the rollers 18a of the gear assemblies 18 are pressed against the inner surfaces of the lower ends of the opposite sides of the hood 2a of the cover 2. Therefore, when the drive power of the displacement motor 15 is transmitted through the train of speed reduction gears 16 to the gear assemblies 18 on the left side area of the base panel 4, the cover 2 is moved longitudinally in a direction depending on the direction in which the drive shaft of the displacement motor 15 rotates.

An inner cover 19 is disposed in the cover 2. The inner cover 19 is made of an opaque material such as synthetic resin, and has a substantially wagon-roofed shape that is open downwardly and elongate in the anteroposterior direction. The inner cover 19 comprises a closure 19a having a substantially arcuate transverse cross section and a pair of end walls 19b attached to the respective opposite longitudinal ends of the closure 19a, the closure 19a and the end walls 19b being integrally joined to each other. The closure 19a has a through hole 19c defined in a rear end portion thereof and two pairs of longitudinally spaced recesses 19d defined in the lower ends of the opposite sides of the closure 19a. The front end wall 19b has a downwardly open recess defined therein as a passage opening 19e.

The inner cover 19 is mounted on the base panel 4 in covering relation to the guide rails 8, the base unit 9, the control board 10, the support base 11, the unit actuator 12, the display driver 13, and the cover actuator 14. With the inner cover 19 mounted on the base panel 4, the display 13b of the display driver 13 is positioned in alignment with the through hole 19c for the user to be able to view information displayed on the display 13b through the through hole 19c. The recesses 19d are positioned respectively over the gear assemblies 18, which partly project out of the inner cover 19 through the recesses 19d. The base unit 9 is movable forwardly through the passage opening 19e.

Three rotors 20 are rotatably supported in the base panel 4 at the recording medium mount 7. The rotors 20 serve to center the disk-shaped recording medium and also to lift and lower the disk-shaped recording medium.

Each of the rotors 20 has a substantially cylindrical shape and has an upper surface 20a shaped as a gradual concave surface that is aligned with and smoothly blends into the disk mount surface 7a of the recording medium mount 7. A disk centering member 21 is disposed at one end of the upper surface 20a of each rotor 20 and is positioned immediately outwardly of the disk mount surface 7a.

A cam member (not shown) is rotatably supported on the lower surface of the base panel 4. When the cam member rotates, the rotors 20 are rotated and moved vertically.

The base unit 9 has a casing 22 in which various components are disposed or supported. The casing 22 comprises an upper case 23 and a lower case 24 which are joined to each other (see FIGS. 1 and 3).

The upper case 23 is in the form of a downwardly open, substantially rectangular box that is elongate in the anteroposterior direction. The upper case 23 comprises an upper plate 23a, a peripheral wall 23b projecting downwardly from the peripheral edge of the upper plate 23a, and a protrusive plate 23c projecting downwardly from a rear end portion of the peripheral wall 23b. The upper plate 23a, the peripheral wall 23b, and the protrusive plate 23c are integrally joined together. The upper case 23 has a recess 23d defined beneath the peripheral wall 23b which is free of the protrusive plate 23c, the recess 23d having a vertical depth corresponding to the height of the protrusive plate 23c.

A limit pin 25 projects downwardly from the lower surface of the upper plate 23a of the upper case 23. The limit pin 25 functions as a limit member for limiting lateral movement of a support arm to be described later.

Figure 3:
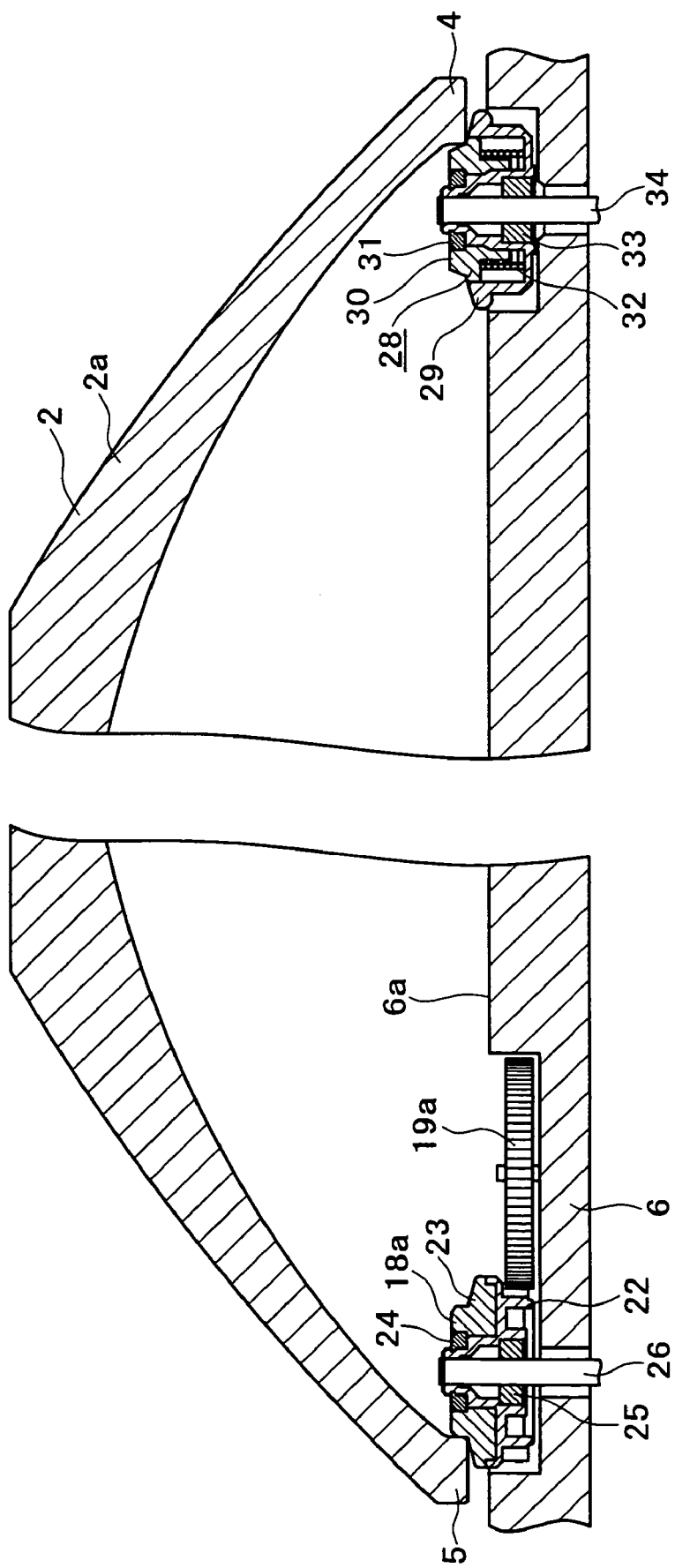
FIG. 3 is a cross-sectional view of a body in a direction perpendicular to the direction in which a cover slides.
Figure 4:
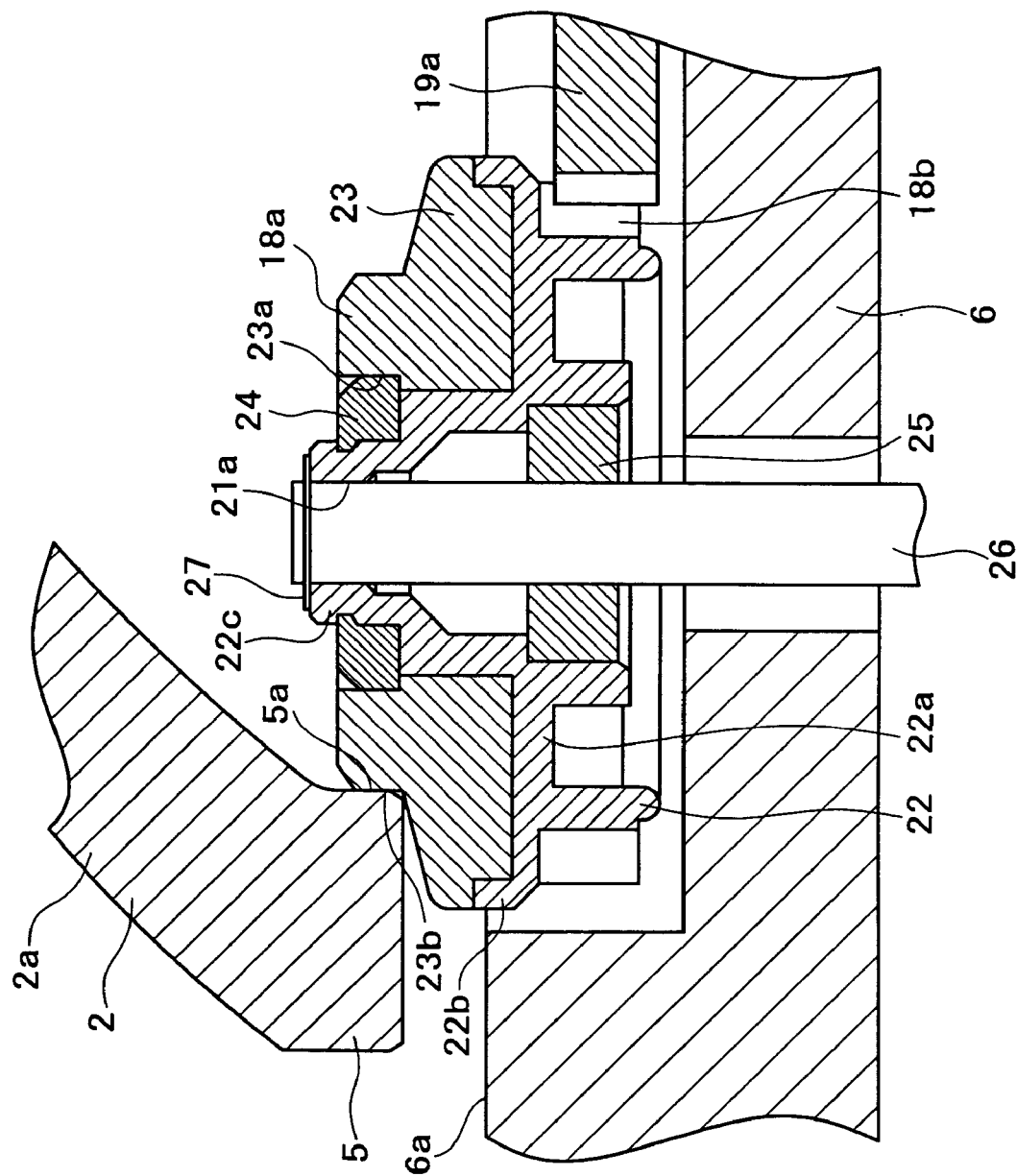
FIG. 4 is an enlarged cross-sectional view showing the manner in which a roller body is pressed against a portion to be delivered of the cover.

The lower case 24 is in the form of an upwardly open, substantially rectangular box that is elongate in the anteroposterior direction (see FIGS. 3 and 4). The lower case 24 comprises a bottom wall 24a and a peripheral wall 24b projecting upwardly from the peripheral edge of the bottom wall 24a. The bottom wall 24a and the peripheral wall 24b are integrally joined to each other.

A spindle motor 26 (see FIGS. 3 through 5) is mounted in a front end portion of the lower case 24. The spindle motor 26 comprises a rotor 26a and a stator 26b. The rotor 26a comprises a rotor case 26c and a magnet 26d mounted on the inner circumferential surface of the rotor case 26c. The stator 26b comprises a circular array of circumferentially spaced stator coils 26e and a stator board 26f supporting the stator coils 26e thereon.

An optical pickup 27 (see FIGS. 3 and 4) is supported in the lower case 24 so as to be movable in the longitudinal direction of the lower case 24. The optical pickup 27 has a movable base 27a with guide members 27b, 27c mounted on respective lateral ends thereof.

The lower case 24 also houses therein a stepping motor 28 and a lead screw 29 that can be rotated about its own axis by the stepping motor 28.

The guide member 27b of the optical pickup 27 slidably engages a portion of an assembly plate to be described later. The other guide member 27c of the optical pickup 27 is threaded over the lead screw 29. When the stepping motor 28 is energized, the movable base 27a of the optical pickup 27 moves longitudinally along the lead screw 29 in a direction depending on the direction in which the drive shaft of the stepping motor 28 rotates.

An upwardly projecting sleeve 30 is mounted on the bottom wall 24a of the lower case 24 near its rear end.

The upper case 23 and the lower case 24 are fastened to each other by screws, for example, providing the casing 22 in which the lower surface of the protrusive plate 23c and the upper surface of the peripheral wall 24b are held in contact with each other. The assembled casing 22 has an insertion slot 22a (see FIG. 1) for inserting a disk-shaped recording medium 100, between the upper case 23 and the lower case 24, the insertion slot 22a being provided by the recess 23d in the upper case 23.

Figure 6:
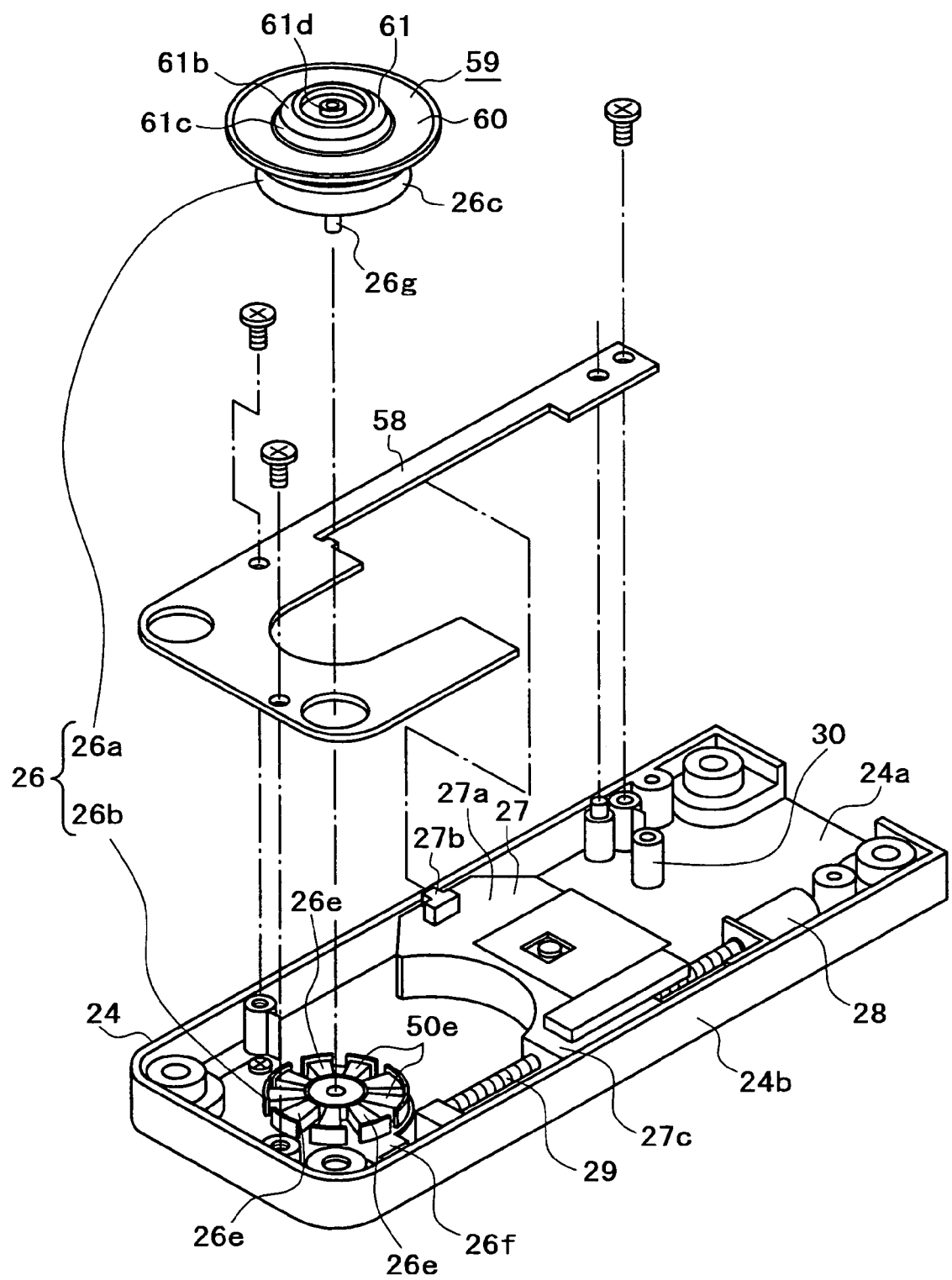
FIG. 6 is an exploded perspective view of some components of the base unit.

A guide member 31 (see FIG. 3) is mounted on the lower surface of the upper case 23. As shown in FIG. 6, the guide member 31 comprises a flat plate 32 and a pair of side plates 33 projecting downwardly from respective side edges of the flat plate 32, the flat plate 32 and the side plates 33 being integrally joined to each other.

Three guide pins 32a project downwardly from the lower surface of the flat plate 32. A gear support shaft 34 is mounted on the flat plate 32 and projects downwardly from the lower surface of the flat plate 32. The flat plate 32 has a pin insertion hole 32b defined therein.

Two pairs of anteroposteriorly spaced guide holes 35 are defined in the respective side plates 33. The guide holes 35 are elongate vertically.

Figure 7:
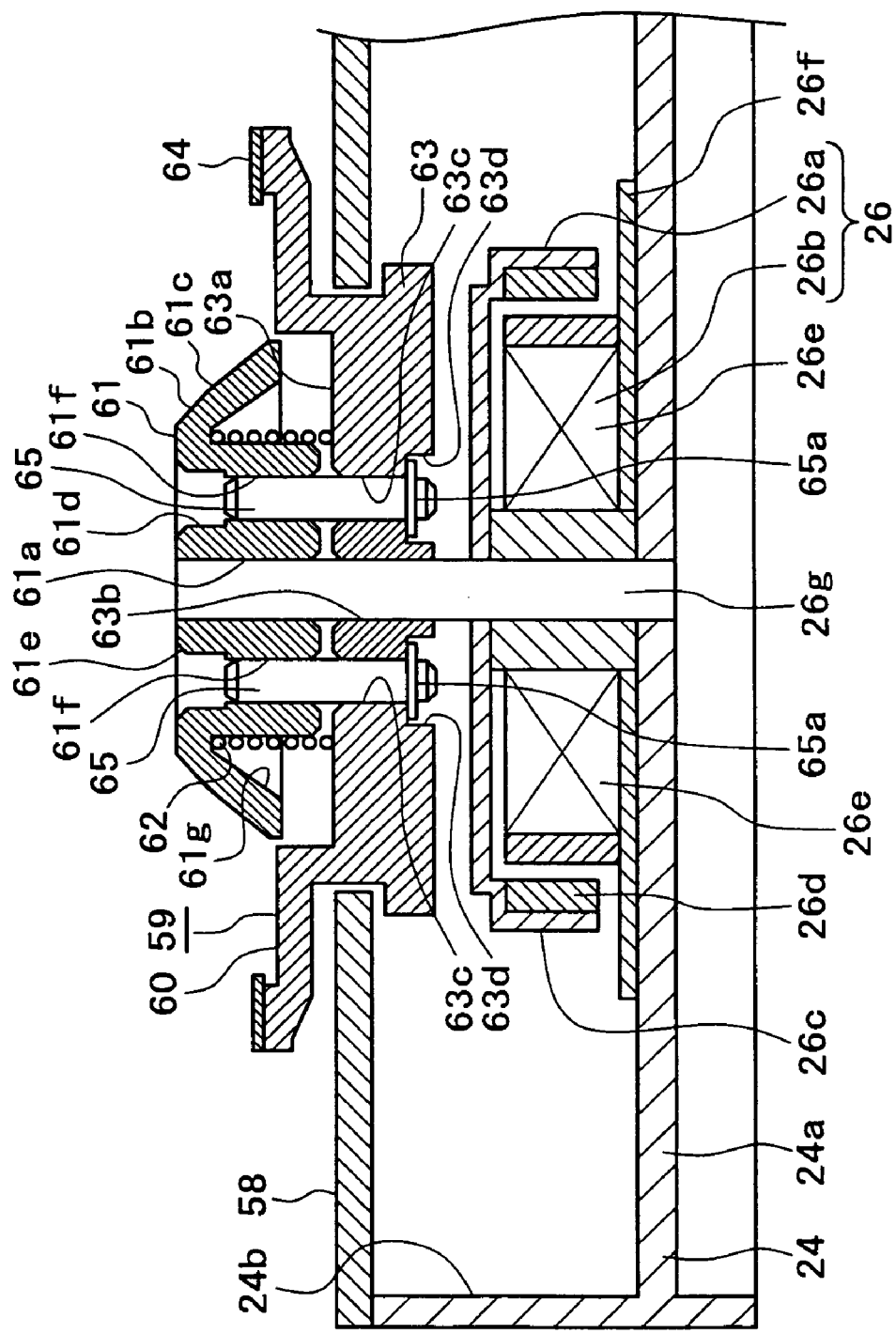
FIG. 7 is an enlarged fragmentary cross-sectional view of a disk table and a spindle motor.

A cam slider 36 (see FIG. 3) is supported on the guide member 31 for anteroposterior movement. As shown in FIG. 7, the cam slider 36 comprises a flat plate 37 and a pair of side plates 38 projecting downwardly from respective side edges of the flat plate 37, the flat plate 37 and the side plates 38 being integrally joined to each other.

The flat plate 37 has a first clearance hole 37a and a second clearance hole 37b which are defined therein and spaced laterally from each other. The first clearance hole 37a and a second clearance hole 37b are elongate in the anteroposterior direction. The flat plate 37 has three guide holes 37c defined in laterally opposite ends thereof. The guide pins 32a of the guide member 31 slidably engage in the respective guide holes 37c.

Two pairs of anteroposteriorly spaced front and rear cam holes 39, 40 (see FIGS. 7 and 8) are defined in the respective side plates 38. Each of the front cam holes 39 comprises a horizontal section 39a that extends in the anteroposterior direction, a slanted section 39b joined to the rear end of the horizontal section 39a and extending obliquely downwardly in the rearward direction, and a retaining section 39c joined to the rear end of the slanted section 39b and extending gradually obliquely downwardly in the rearward direction. Therefore, the retaining section 39c is inclined to the horizontal section 39a at a smaller angle than the slanted section 39b. Each of the rear cam holes 40 also comprises an upper horizontal section 40a that extends in the anteroposterior direction, a slanted section 40b joined to the rear end of the upper horizontal section 40a and extending obliquely downwardly in the rearward direction, and a lower horizontal section 40c joined to the rear end of the slanted section 40b and extending in the anteroposterior direction.

The horizontal sections 39a of the front cam holes 39 are positioned slightly upwardly of the upper horizontal sections 40a of the rear cam holes 40. Therefore, as shown in FIG.

8, a vertical median line M1 of the horizontal sections 39*a* is higher than a vertical median line M2 of the upper horizontal sections 40*a*.

Figure 8:
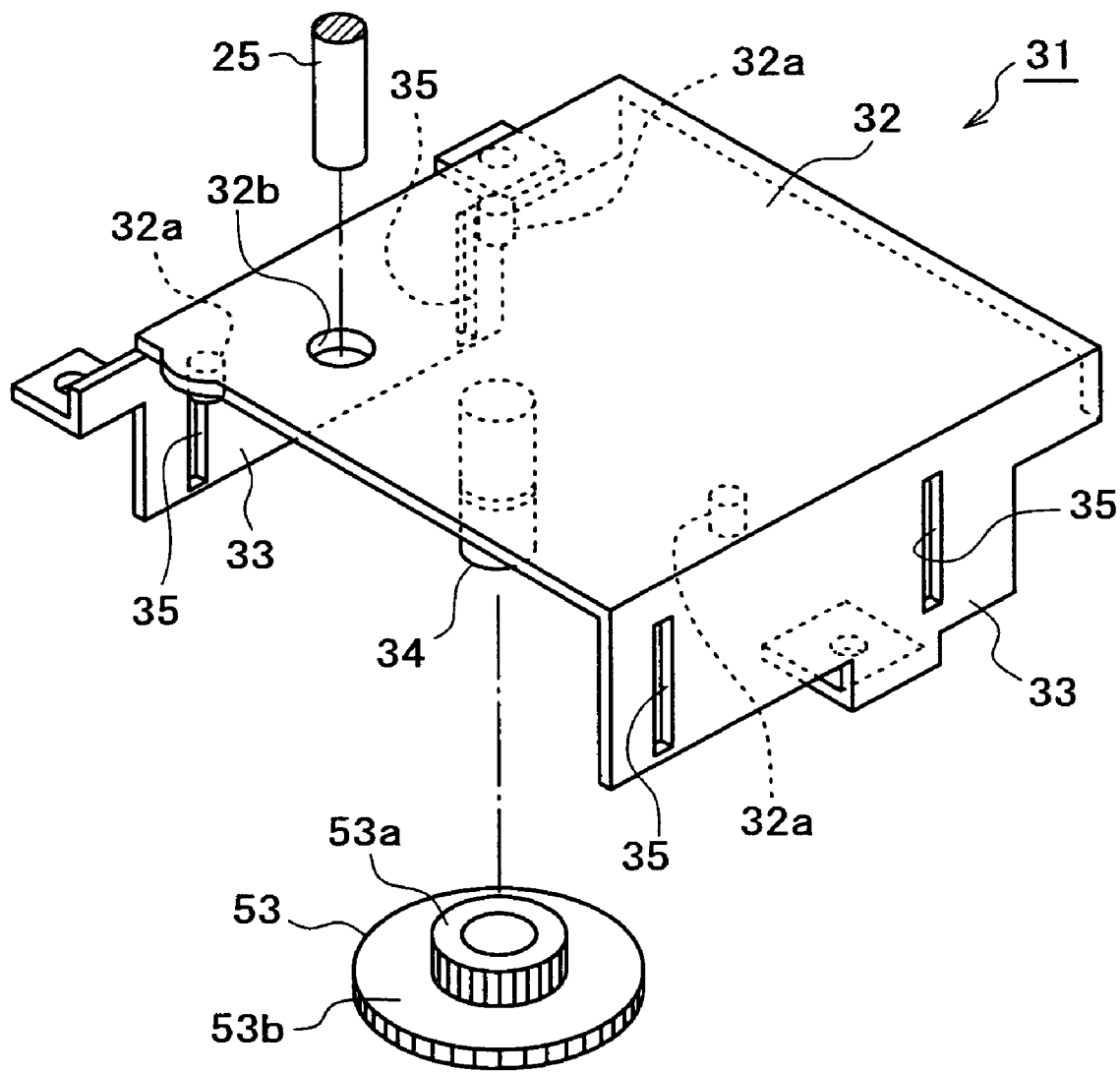
FIG. 8 is an enlarged perspective view of a guide member, a limit pin, and a drive gear.

As described above, the retaining sections 39*c* of the front cam holes 39 extend gradually obliquely downwardly in the rearward direction, and have their front ends in the same vertical position as the lower horizontal sections or acting sections 40*c* of the rear cam holes 40. Therefore, as shown in FIG. 8, the rear ends of the retaining sections 39*c* are lower than a vertical median line M3 of the acting sections 40*c*.

As shown in FIGS. 3 and 7, a rack member 41 is mounted on the lower surface of the flat plate 37.

As shown in FIG. 3, a support arm 42 is supported by the cam slider 36 and the guide member 31. The cam slider 36 and the guide member 31 function as a moving means or moving the support arm 42 substantially vertically.

Figure 9:
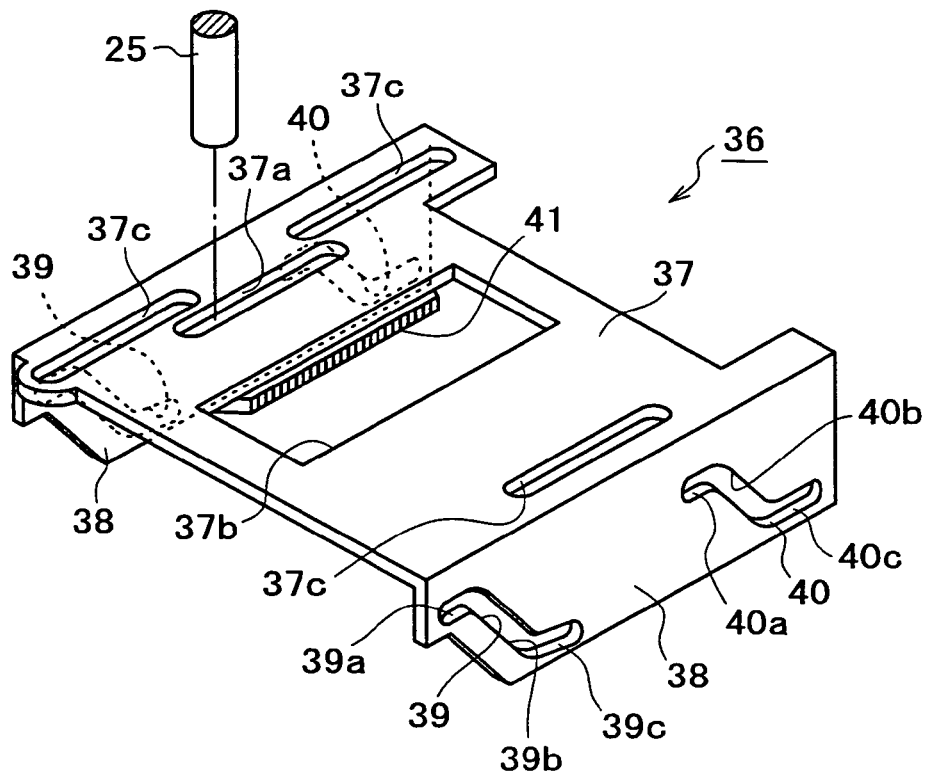
FIG. 9 is an enlarged perspective view of a cam slider and the limit pin.

As shown in FIG. 9, comprises an anteroposteriorly long arm plate 43 and a pair of side plates 44 projecting downwardly from respective opposite side edges of a rear portion of the arm plate 43, the arm plate 43 and the side plates 44 being integrally joined to each other. The support arm 42 is made of a highly rigid material such as metal.

The arm plate 43 has a support hole 43*a* (see FIG. 3) defined in a front end thereof and a gear hole 43*b* (see FIG. 9) defined in a rear end thereof. A limit hole 43*c* is defined in the arm plate 43 near the gear hole 43*b*. The limit hole 43*c* is slightly elongate in the anteroposterior direction and has a lateral width which is substantially the same as the outside diameter of the limit pin 25 that projects downwardly from the upper case 23. Spring support holes 43*d* are defined in respective opposite side edges of the arm plate 43 near its rear end.

The arm 43 has a pair of stiffening ribs 43*e* on its portion between the front and rear ends thereof. The stiffening ribs 43*e* are disposed on respective opposite side edge of the arm plate 43, and are formed by bending side portions of the arm plate 43 upwardly through 90°.

Two pairs of longitudinally spaced first and second lifting/lowering pins 45, 46 project outwardly from the side plates 44. A joint shank 47 is disposed between the side plates 44, and extends between and is joined to the first lifting/lowering pins 45 that are positioned on the front side of the side plates 44. Therefore, the joint shank 47 is positioned between the inner surfaces of the side plates 44.

The side plates 44 have respective pin support holes 44*a* that are elongate vertically. The first lifting/lowering pins 45 slidably engage respectively in the pin support holes 44*a*. The first lifting/lowering pins 45 are movable in a movable range provided by the pin support holes 44*a*, i.e., between a non-acting position at the upper end of the movable range and an acting position at the lower end of the movable range.

Spring support members 44*b* are disposed on the upper ends, respectively, of the side plates 44. The spring support members 44*b* are formed by bending portions of the side plates 44 inwardly. The spring support members 44*b* are spaced a predetermined gap from the arm plate 43 (see FIG. 11).

Figure 11:
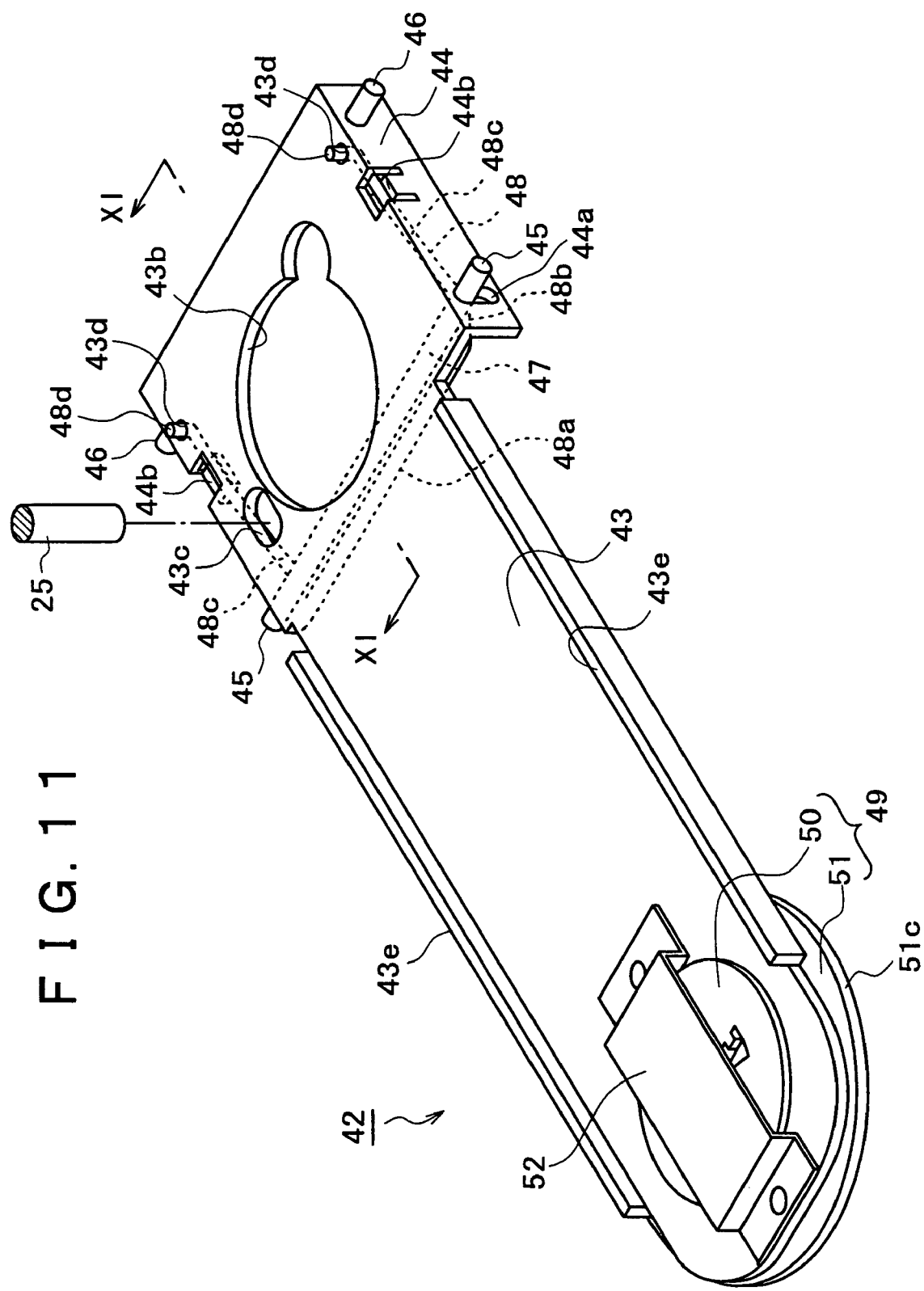
FIG. 11 is an enlarged perspective view of a support arm, a chucking pulley, and the limit pin.

As shown in FIGS. 3, 9, and 11, a bias spring 48 is mounted in the support arm 42. The bias spring 48 comprises a laterally elongate base portion 48*a*, a pair of front deformed portions 48*b* projecting substantially rearwardly from respective opposite lateral ends of the base portion 48*a*, a pair of rear deformed portions 48*c* projecting substantially rearwardly from respective rear ends of the front deformed portions 48*b*, and a pair of support portions 48*d* projecting upwardly from respective rear ends of the rear deformed portions 48*c*, these portions being integrally joined together. The front deformed portions 48*b* and the rear deformed portions 48*c* are joined to each other by slightly bent resilient contact portions 48*e*.

The bias spring 48 is mounted in the support arm 43 such that the support portions 48*d* are inserted respectively in the spring support holes 43*d* in the arm plate 43, the rear deformed portions 48*c* have rear end portions inserted between the spring support members 44*b* and the arm plate 43, and the resilient contact portions 48*e* are resiliently held in contact with the joint shank 47 upwardly. Consequently, the first lifting/lowering pins 45 are normally urged to move upwardly by the bias spring 48.

Figure 10:
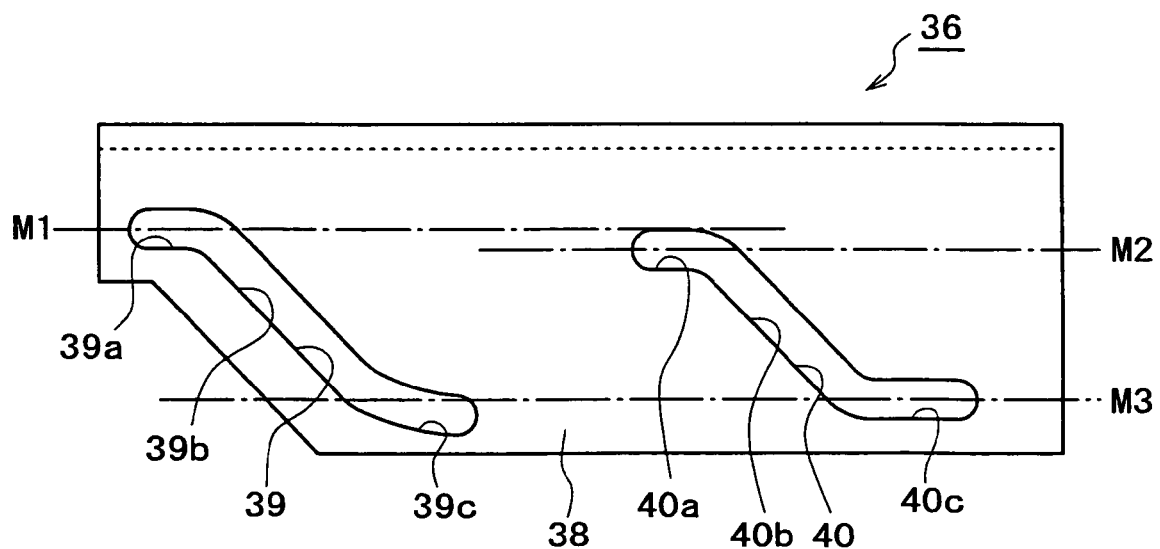
FIG. 10 is an enlarged side elevational view of the cam slider.

As shown in FIG. 10, the support arm 42 is supported by the cam slider 36 with the front first lifting/lowering pins 45 inserted respectively in the front cam slots 39 in the cam slider 36 and respectively in the front guide holes 35 in the guide member 31, and with the rear second lifting/lowering pins 46 inserted respectively in the rear cam slots 40 in the cam slider 36 and the rear guide holes 35 in the guide member 31. When the cam slider 36 moves in the longitudinal direction with respect to the guide member 31, the first lifting/lowering pins 45 and the second lifting/lowering pins 46 are guided by the guide holes 35 and the front and rear cam slots 39, 40 to move the support arm 42 in a substantially vertical direction.

The limit pin 25 which passes through the pin insertion hole 32*b* in the guide member 31 and the first clearance hole 37*a* in the cam slider 36 is inserted in the limit hole 43*c* in the support arm 42. The limit hole 43*c* serves as a limited member and is limited by the limit pin 25 to cause the support arm 42 to move in the substantially vertical direction without wobbling laterally. The limit pin 25 has a lower end inserted into the sleeve 30 on the lower case 24, thus positioning the upper case 23 and the lower case 24 relatively to each other.

As shown in FIGS. 3, 9, 10, and 12, a chucking pulley 49 is supported on the support arm 42. The chucking pulley 49 comprises a support plate 50 and a presser 51 that are vertically coupled to each other.

The support plate 50 is in the form of a substantially circular plate and has an outside diameter greater than the diameter of the support hole 43*a* in the support arm 42. The support plate 50 has a knob insertion hole 50*a* defined centrally therein.

Figure 12:
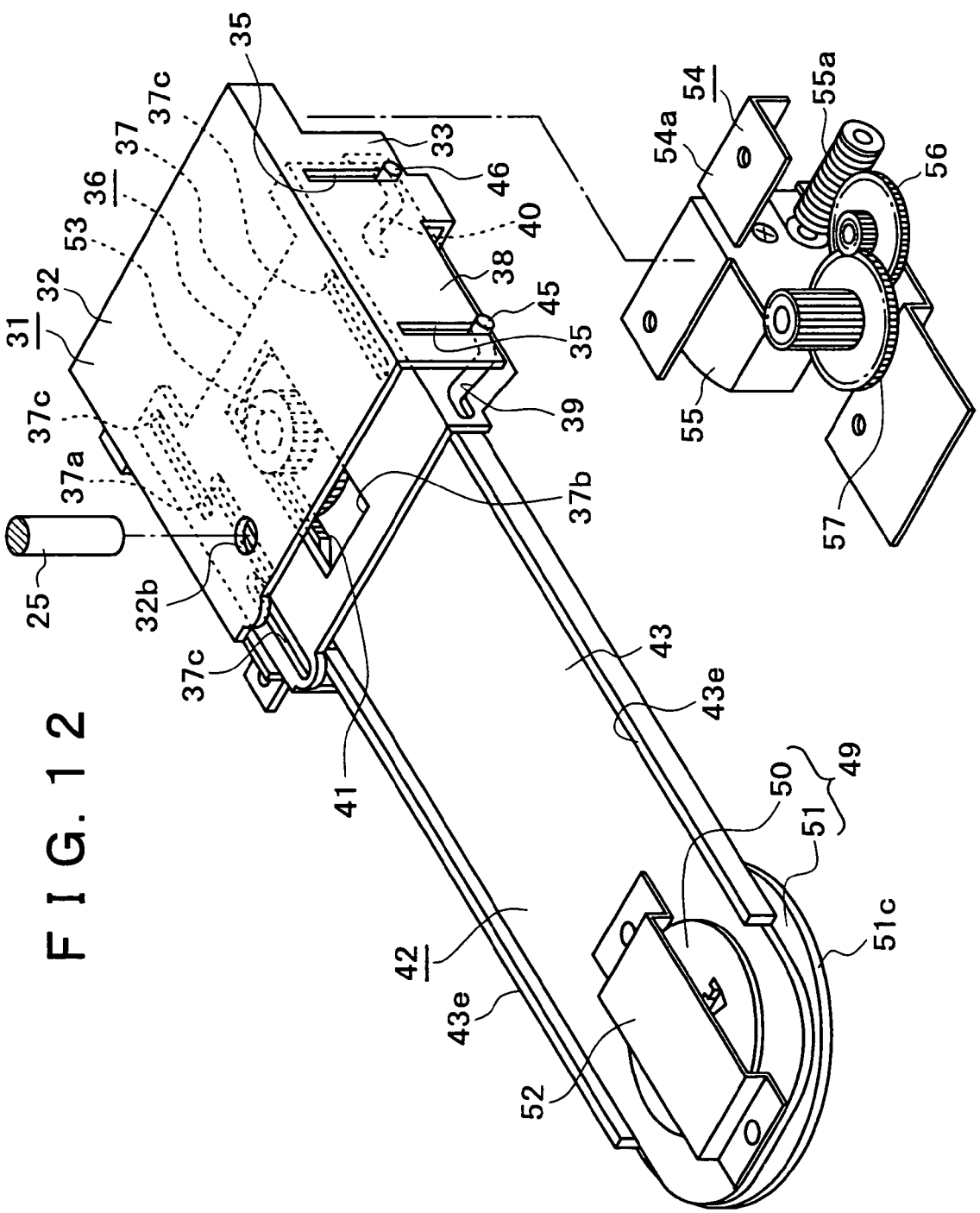
FIG. 12 is an enlarged perspective view showing the manner in which the support arm is supported on the guide member and the cam slider, with a drive unit being shown as separated.

As shown in FIG. 12, the presser 51 comprises a circular attachment 51*a*, a peripheral member 51*b* projecting obliquely downwardly from an outer peripheral edge of the circular attachment 51*a*, an annular presser member 51*c* contiguous to a lower edge of the peripheral member 51*b*, and a cylindrical positioning tube 51*d* projecting downwardly from a lower surface of the circular attachment 51*a*. The positioning tube 51*d* has a guide hole 51*e* defined in a lower inner peripheral edge thereof and having a surface slanted downwardly toward the outer circumferential surface of the positioning tube 51*d*, and an insertion hole 51*f* defined therein and extending upwardly from the guide hole 51*e*. The circular attachment 51*a* has an upwardly convex, substantially hemispherical rotary slide knob 51*g* mounted centrally thereon.

The circular attachment 51*a* and the peripheral member 51*b* of the presser 51 are inserted upwardly into the support hole 43*a*, and the circular attachment 51*a* is attached to the attachment 50, thus supporting the chucking pulley 49 on the support arm 42. With the presser 51 mounted on the support plate 50, the rotary slide knob 51*g* projects upwardly through the knob insertion hole 50*a*. The chucking pulley 49 that is supported on the support arm 42 is rotatable about its own axis and movable axially, i.e., vertically.

A holder 52 is fixedly mounted on the upper surface of the arm plate 43 in covering relation to the support plate 50 of the chucking pulley 49 that is mounted on the support arm 42. The holder 52 is made of a highly rigid material such as metal. The holder 52 has an outer peripheral portion thereof securely fixed to the arm plate 43 and a remaining portion spaced upwardly from the arm plate 43.

With the support arm 42 supported by the guide member 31 and the cam slider 36, the gear support shaft 34 extends through the second clearance hole 37b in the cam slider 36. The gear support shaft 34 supports thereon a two-step drive gear 53 (see FIG. 3) having a smaller-diameter gear 53a and a larger-diameter gear 53b. The two-step drive gear 53 is disposed in the gear hole 43b in the support arm 42, with the smaller-diameter gear 53a being held in mesh with the rack member 41 mounted on the cam slider 36.

An actuator unit 54 (see FIG. 3) is mounted on the lower surface of a rear end of the flat plate 32 of the guide member 31. As shown in FIG. 10, the actuator unit 54 comprises a mount plate 54a, a lifting/lowering motor 55 mounted on the mount plate 54a, and a first speed reduction gear 56 and a second speed reduction gear 57 that are supported on the mount plate 54a. The lifting/lowering motor 55 has a motor shaft with a worm 55a fixed thereto which is held in mesh with the first speed reduction gear 56 that is in turn held in mesh with the second speed reduction gear 57.

With the actuator unit 54 mounted on the guide member 31, the second speed reduction gear 57 is in mesh with the larger-diameter gear 53b of the drive gear 53. When the lifting/lowering motor 55 is energized, the drive power thereof is transmitted successively through the first speed reduction gear 56, the second speed reduction gear 57, and the drive gear 53 to the rack member 41, moving the cam slider 36 in a longitudinal direction depending on the direction in which the motor shaft of the lifting/lowering motor 55 rotates.

An assembly plate 58 (see FIGS. 3 and 4) is fastened by the lower case 24 of the casing 22 by screws, for example. The guide member 27b of the optical pickup 27 slidably engages a portion of the assembly plate 58.

Figure 5:
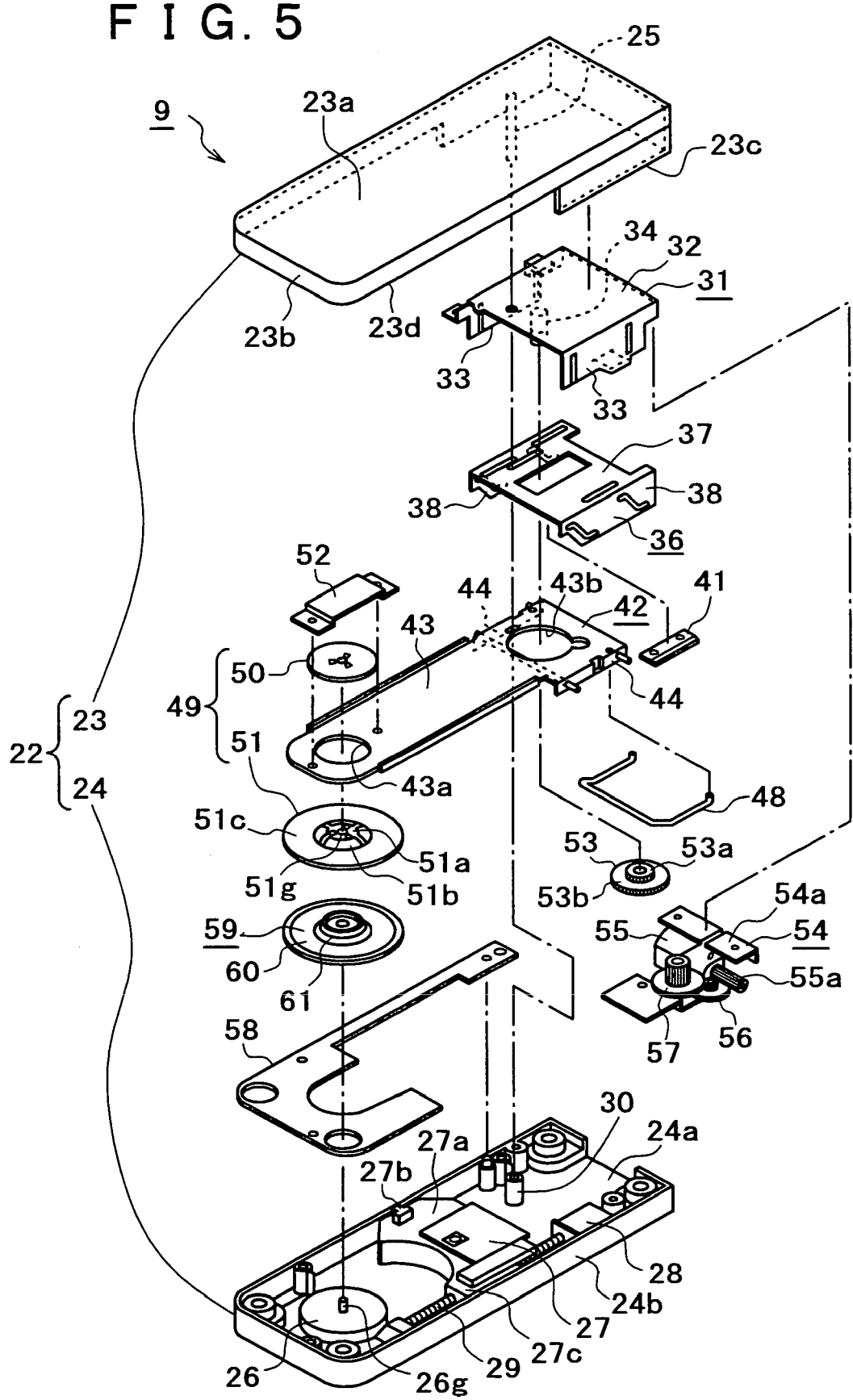
FIG. 5 is an exploded perspective view of a base unit of the disk drive device.

As shown in FIGS. 3 through 5, a disk table 59 is fixed to a motor shaft 0.26g of the spindle motor 26 disposed in the casing 22.

The disk table 59 comprises a table 60, a centering head 61, and a helical compression spring 62 (see FIG. 5).

The table 60 comprises a base portion 63 having an outer contour and a placement flange 64 projecting outwardly from an outer peripheral edge of the base portion 63. The base portion 63 has an upwardly open cavity 63a defined in an upper surface thereof, a vertical through fixing hole 63b defined centrally therein, and two vertical through shaft support holes 63c defined in 180°-spaced positions that are diametrically spaced from each other across the fixing hole 63b. The base portion 63 also has two limit recesses 63d defined in a lower surface thereof below and in communication with the shaft support holes 63c. The limit recesses 63d are downwardly open and have an opening area greater than the shaft support holes 63c.

The motor shaft 26g of the spindle motor 26 is fixedly inserted in the fixing hole 63b in the table 60. The motor shaft 26g is press-fitted in the rotor case 26c of the spindle motor 26 for rotation in unison with the rotor 26a.

The centering head 61 has a portion disposed in the recess 63a in the table 60. The centering head 61 has a vertical through support hole 61a defined centrally therein. The motor shaft 26g has an upper end portion inserted in the support hole 61a, and the centering head 61 is axially movably supported on the motor shaft 26g. The centering head 61 has on its outer circumferential surface a guiding slanted surface 61b and a centering slanted surface 61c that are successively positioned from above. The guiding slanted surface 61b is inclined to the axis of the motor shaft 26g at a greater angle than the centering slanted surface 61c.

The centering head 61 has a positioning protrusion 61d disposed around the support hole 61a. The positioning protrusion 61d has on its outer peripheral surface a guide edge 61e that is slanted inwardly in the upward direction.

The centering head 61 also has two shaft fixing holes 61f defined in 180°-spaced positions that are diametrically spaced from each other across the shaft fixing hole 61a. The shaft fixing holes 61f extend vertically through the centering head 61.

The centering head 61 also has a downwardly open spring support cavity 61g defined therein around the support hole 61a.

The helical compression spring 62 is housed in the spring support cavity 61g and compressed between the table 60 and the centering head 61. The centering head 61 is thus normally biased to move upwardly away from the table 60 under the resiliency of the helical compression spring 62, providing a certain gap between the bottom of the recess 63a in the table 60 and the lower surface of the centering head 61 for allowing the centering head 61 to move vertically.

Retaining shafts 65 are inserted respectively in the shaft support holes 63c in the table 60 and have respective upper end portions fixedly inserted in the respective shaft fixing holes 61f in the centering head 61. The retaining shafts 65 are slidable in the shaft support holes 63c.

E-rings 65a are mounted respectively on the lower ends of the retaining shafts 65. The E-rings 65a are positioned respectively in the limit recesses 63d in the table 60. The E-rings 65a are held in contact with the upper bottom surfaces of the limit recesses 63d to prevent the centering head 61 that is upwardly biased by the helical compression spring 62 from dropping off.

The disk drive device 1 is constructed as described above. The guide member 31, the cam slider 36, the support arm 42, the bias spring 48, the chucking pulley 49, the holder 52, the disk table 59, etc. jointly make up a disk chucking mechanism 66 (see FIG. 12).

When the centering head 61 is inserted upwardly into a central hole 100a in the disk-shaped recording medium 100, the guiding slanted surface 61b of the centering head 61 guides the inner peripheral edge of the disk-shaped recording medium 100 to move into contact with the centering slanted surface 61c. After the centering head 61 is inserted in the central hole 100a in the disk-shaped recording medium 100, the chucking pulley 49 is lowered, and the disk table 59 and the chucking pulley 49 clamp the inner peripheral portion of the disk-shaped recording medium 100, thereby chucking the disk-shaped recording medium 100.

At this time, the slanted surface of the guide hole 51e in the positioning tube 51d of the chucking pulley 49 is guided by the guide edge 61e of the positioning protrusion 61d of the disk table 59 to insert the positioning protrusion 61d into the positioning tube 51d, thereby positioning the chucking pulley 49 and the disk table 59. Simultaneously, with the inner peripheral edge of the disk-shaped recording medium 100 being held in contact with the centering slanted surface 61c, the descent of the chucking pulley 49 displaces the disk-shaped recording medium 100 and the centering head 61 together downwardly against the bias of the helical compression spring 62, thereby positioning (centering) the disk-shaped recording medium 100 with respect to the motor shaft 26*g*.

As described above, since the centering head 61 is movable with respect to the table 60 in the axial direction of the motor shaft 26*g*, variations in the diameter of the central hole 100*a* in the disk-shaped recording medium 100 are absorbed, so that the disk-shaped recording medium 100 can be centered in alignment with the motor shaft 26*g* with accuracy.

With the disk-shaped recording medium 100 being thus chucked in position, the chucking pulley 49 is pressed downwardly against the disk-shaped recording medium 100 that is pressed against the placement flange 64 of the table 60.

Operation of the disk drive device 1 will be described below with reference to FIGS. 13 through 21.

The disk drive device 1 is able to start to operate when the user presses the power supply button of the operational buttons 6 to turn on the power supply. The initial state of various components of the disk drive device 1 prior to operation thereof will first be described below.

Figure 13:
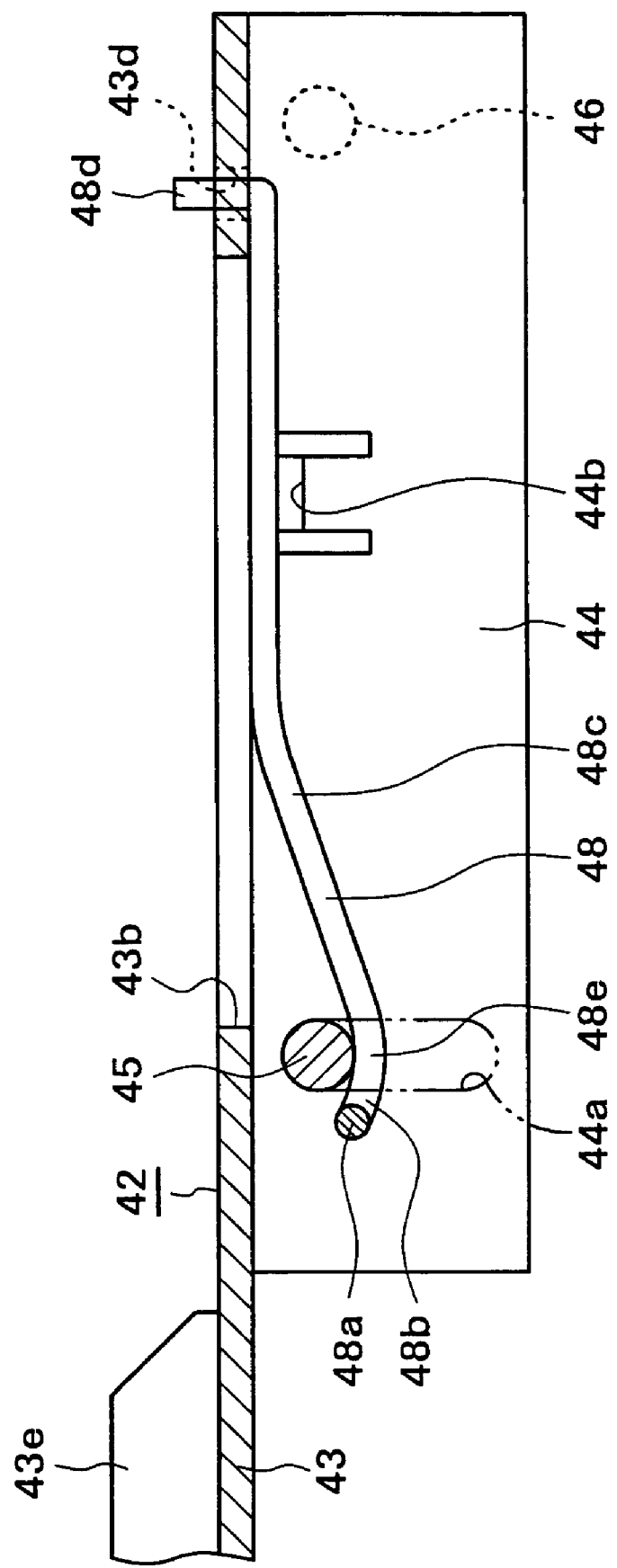
FIG. 13 is an enlarged cross-sectional view taken along line XI—XI of FIG. 9.
Figure 14:
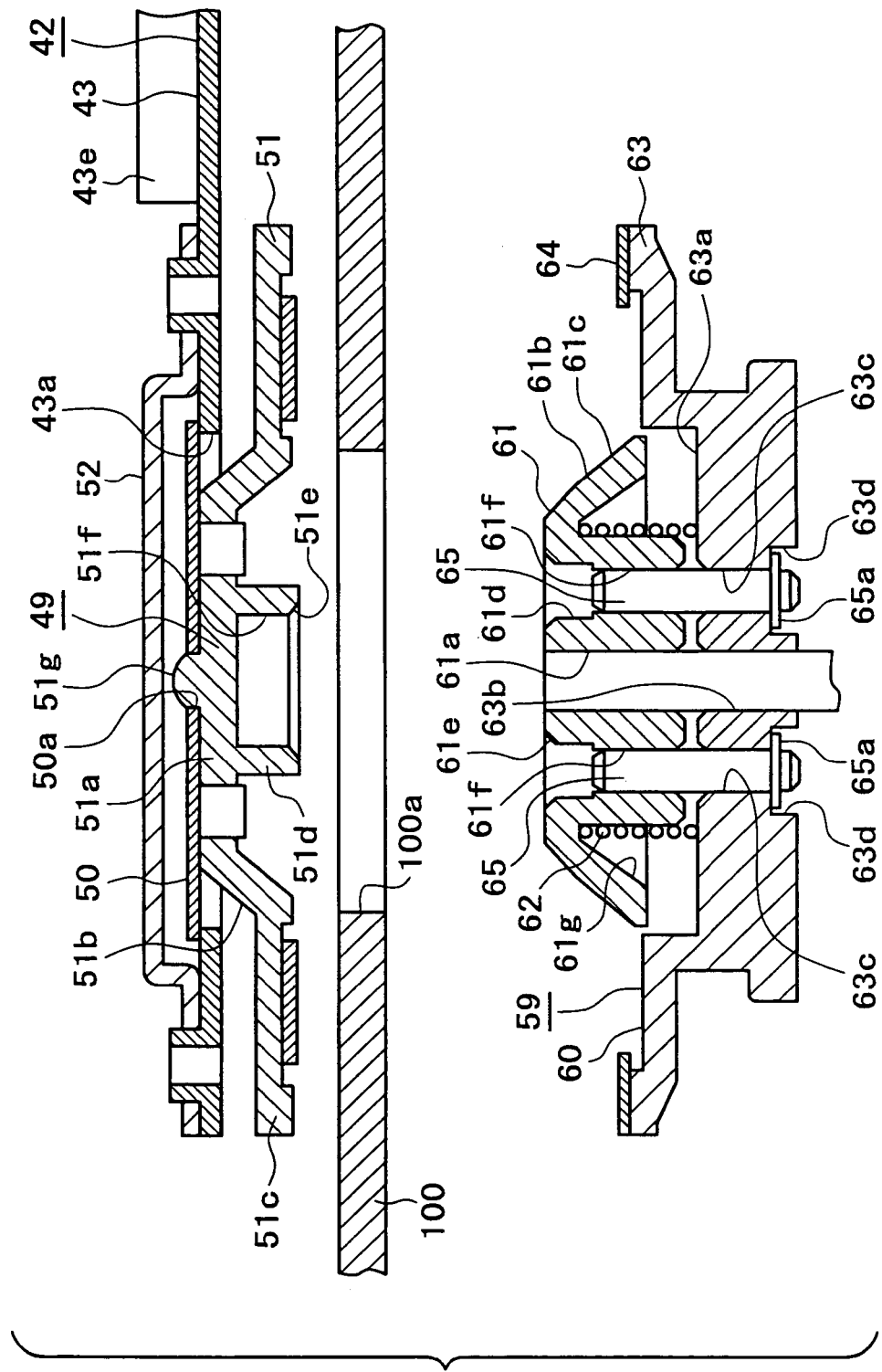
FIG. 14 is an enlarged cross-sectional view of the chucking pulley and the disk table.

In the initial state, as shown in FIG. 13, the base unit 9 is housed in the unit housing space 8*a* between the guide rails 8 in the inner cover 19. While the base unit 9 is being housed in the unit housing space 8*a*, as shown in FIG. 14, the first and second lifting/lowering pins 45, 46 of the support arm 42 engage in the upper ends of the guide holes 35 of the guide member 31, and also engage in the horizontal sections 39*a* of the front cam slots 39 and the upper horizontal sections 40*a* of the rear cam slots 40 of the cam slider 36. The first lifting/lowering pins 45 are biased upwardly by the bias spring 48 into the non-acting position in the upper ends of the pin support holes 44*a* of the support arm 42. Therefore, the cam slider 36 is held in the rear stroke end of its movable range, and the support arm 42 is held in the upper stroke end of its movable range.

At this time, since the horizontal sections 39*a* of the front cam slots 39 are slightly higher than the upper horizontal sections 40*a* of the rear cam slots 40, as described above, the support arm 42 slightly lifted obliquely at its front end when the support arm 42 is held in the upper stroke end of its movable range (see FIG. 14).

In the initial state, the cover 2 is in a closed position in which it covers the recording medium mount 7 and the inner cover 19 (see FIG. 13).

In the initial state, the rotors 20 are positioned in their lower stroke end, and do not project upwardly from the disk mount surface 7*a* of the base panel 4, as shown in FIG. 13. The disk centering members 21 of the rotors 20 are positioned immediately outwardly of the disk mount surface 7*a*.

Figure 15:
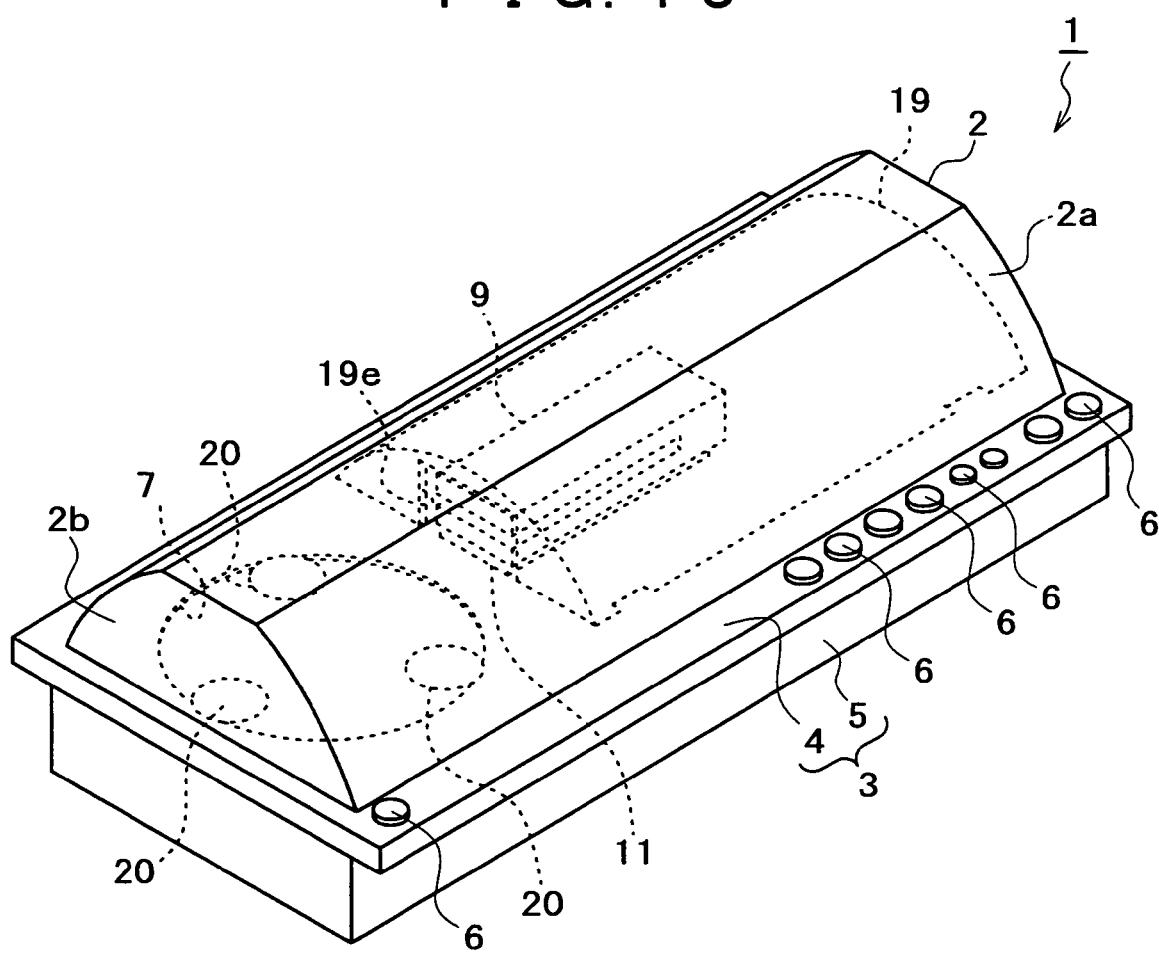
FIG. 15 is a perspective view of the disk drive device, showing an initial state of operation of the disk drive device.

With the power supply button being pressed to turn on the power supply, when the user presses the open button, the cover actuator 14 moves the cover 2 to an open position in which it opens the recording medium mount 7 (see FIG. 15).

Then, the user places the disk-shaped recording medium 100 in an arbitrary position on the disk mount surface 7*a*, and presses the close button.

Figure 16:
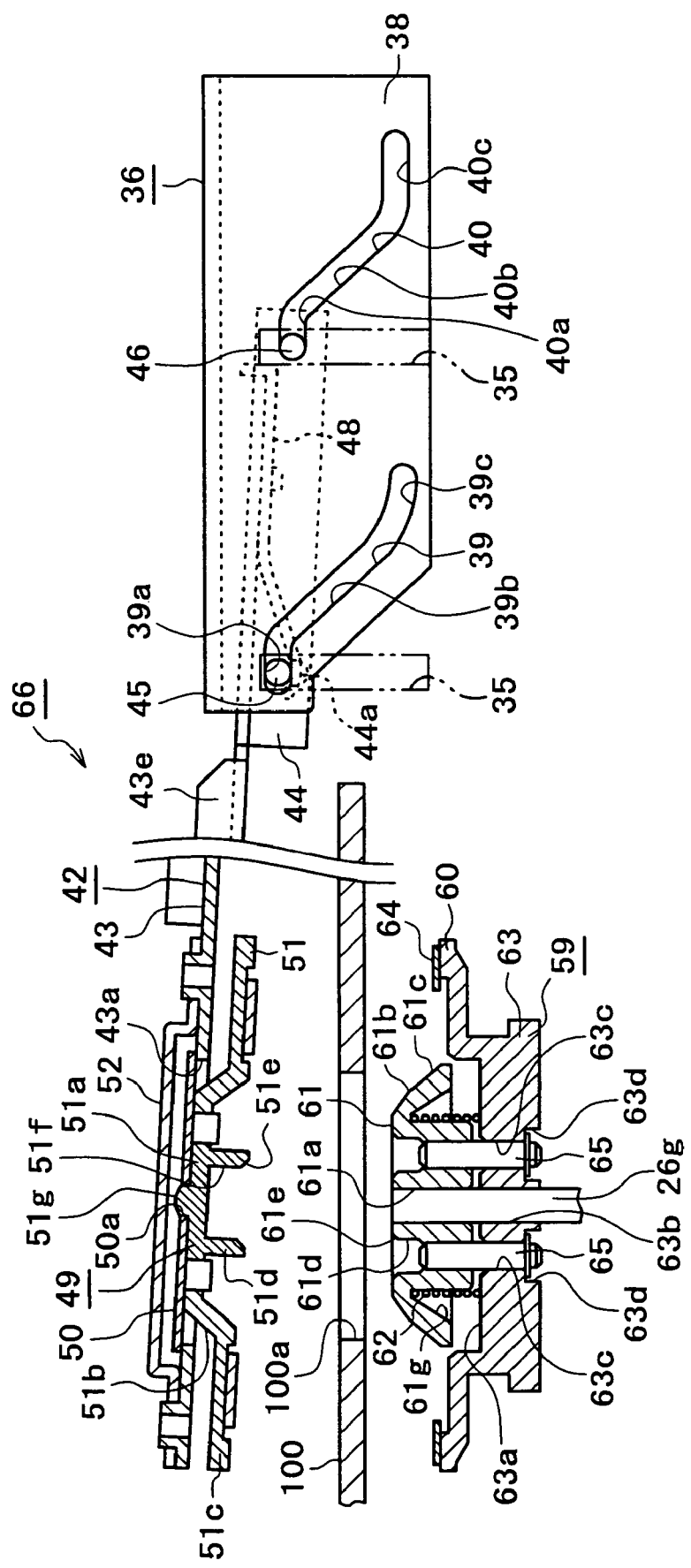
FIG. 16 is a side elevational view, partly in cross section, showing the manner in which a disk-shaped recording medium is inserted between the chucking pulley and the disk table when the disk drive device is in operation.

When the close button is pressed, the cover actuator 14 moves the cover 2 to a closed position in which it covers the recording medium mount 7 (see FIG. 16). Since the recording medium mount 7 is shaped as a shallow recess as described above, the disk-shaped recording medium 100 does not project upwardly from the upper surface of the base panel 4. Therefore, the cover 2 is not brought into contact with the disk-shaped recording medium 100 placed on the disk mount surface 7*a* when the cover 2 is moved to the closed position.

Then, when the user presses the play button, the rotors 20 start to center the disk-shaped recording medium 100. When the centering action is started, the rotors 20 are rotated while being lifted, and the disk centering members 21 are turned to a centering position for centering the disk-shaped recording medium 100. The disk-shaped recording medium 100 has its outer peripheral edge pressed by the disk centering members 21 and is centered (see FIG. 17). At this time, because the rotors 20 are lifted, the disk-shaped recording medium 100 is also lifted.

Figure 17:
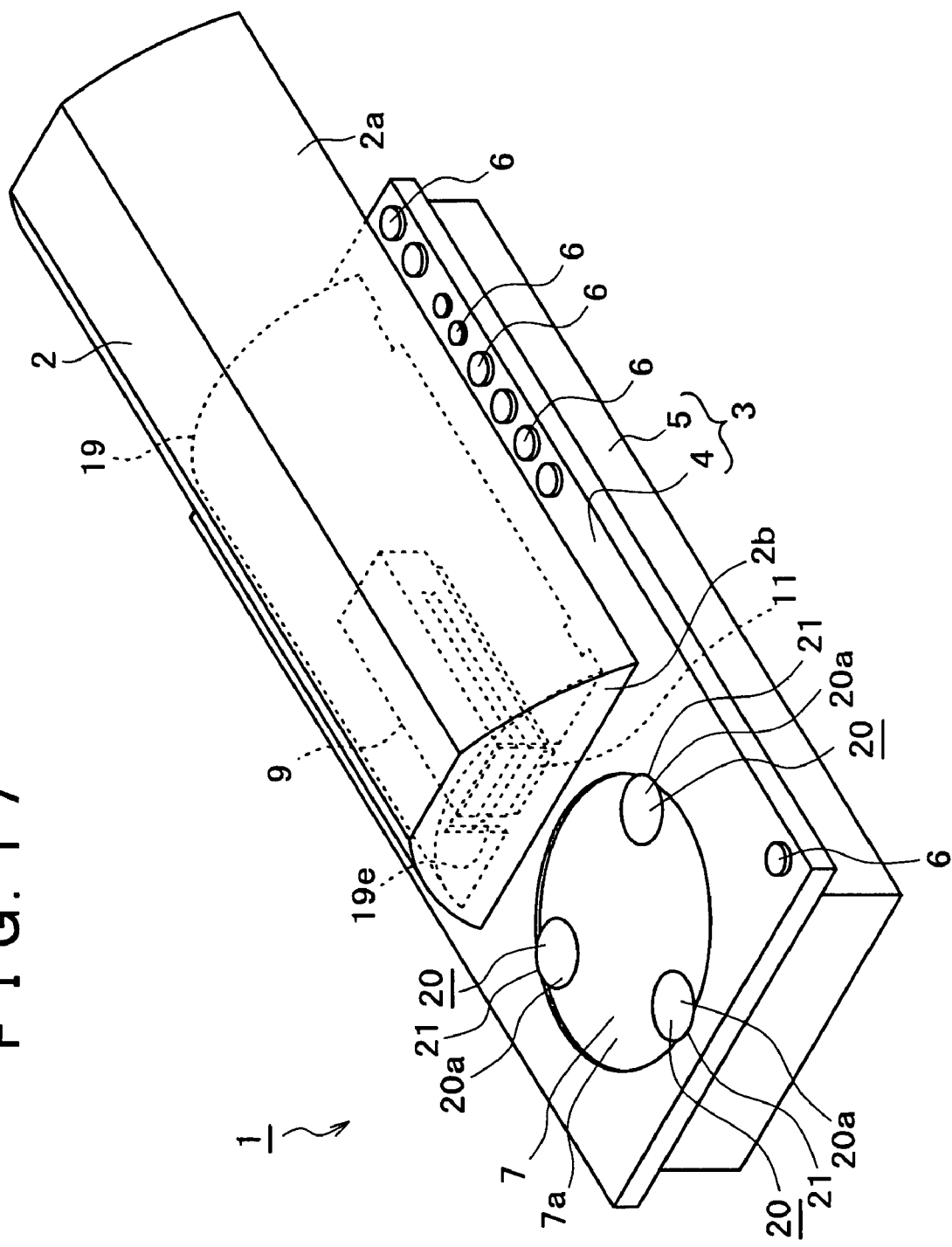
FIG. 17 is a perspective view showing the manner in which the cover is moved to an open position when the disk drive device is in operation.

Then, the unit actuator 12 moves the base unit 9, the control board 10, and the support base 11 in unison in the direction indicated by the arrow L1 in FIG. 17 toward the disk-shaped recording medium 100 that is lifted by the rotors 20.

Figure 18:
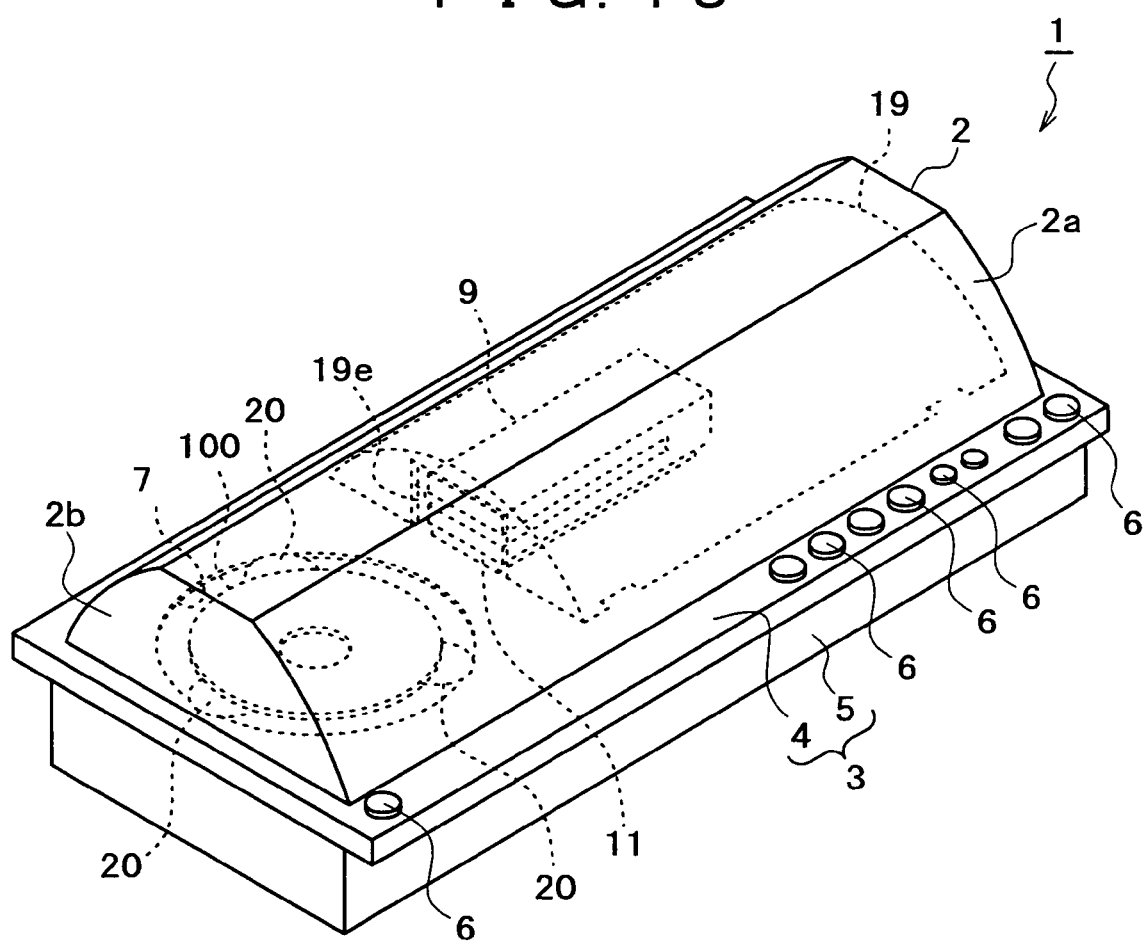
FIG. 18 is a perspective view showing the manner in which the disk-shaped recording medium is placed on a disk mount surface and the cover is moved to a closed position when the disk drive device is in operation.

When the disk table 59 and the chucking pulley 49 are positioned in alignment with the center of the disk-shaped recording medium 100 by the base unit 9 thus moved, the movement of the base unit 9 is stopped (see FIG. 18). At this time, the disk-shaped recording medium 100 that has been lifted off the disk mount surface 7*a* by the rotors 20 is inserted relatively between the chucking pulley 49 and the disk table 59.

When the base unit 9 is moved in the direction indicated by the arrow L1, since the support arm 42 slightly lifted obliquely at its front end, as described above, the chucking pulley 49 does not contact the disk-shaped recording medium 100. The disk-shaped recording medium 100 can thus smoothly be inserted between the chucking pulley 49 and the disk table 59 for reliable operation of the disk drive device 1.

When the movement of the base unit 9 in the direction indicated by the arrow L1, the rotors 20 are lowered to the initial state while in rotation.

When the rotors 20 are lowered, the disk-shaped recording medium 100 also descends in unison with the rotors 20. The centering head 61 of the disk table 59 is inserted into the central hole 100*a* in the disk-shaped recording medium 100, with the centering slanted surface 61*c* being held against the inner peripheral edge of the disk-shaped recording medium 100. Therefore, the rotors 20 are spaced downwardly from the disk-shaped recording medium 100.

When the rotors 20 are spaced downwardly from the disk-shaped recording medium 100 and returned to their initial state, the lifting/lowering motor 55 of the actuator unit 54 mounted on the guide member 31 is energized. The rack member 41 held in mesh with the drive gear 53 is displaced forwardly, causing the cam slider 36 to slide forwardly.

As the cam slider 36 slides forwardly, the first and second lifting/lowering pins 45, 46 of the support arm 42 move relatively in the front and rear cam slots 39, 40 of the cam slider 36 and the guide holes 35 of the guide member 31.

As shown in FIG. 19, the first and second lifting/lowering pins 45, 46 move from the horizontal sections 39*a* into the slanted sections 39*b* of the front cam slots 39 and from the upper horizontal sections 40*a* into the slanted sections 40*b* of the rear cam slots 40, and also move downwardly in the guide holes 35. Therefore, the support arm 42 is moved downwardly, moving the chucking pulley 49 supported on the support arm 42 toward the disk-shaped recording medium 100.

At this time, the support arm 42 is moved downwardly without wobbling laterally as the edges of the limit hole 43*c* are guided by the limit pin 25 on the lower case 24.

Figure 20:
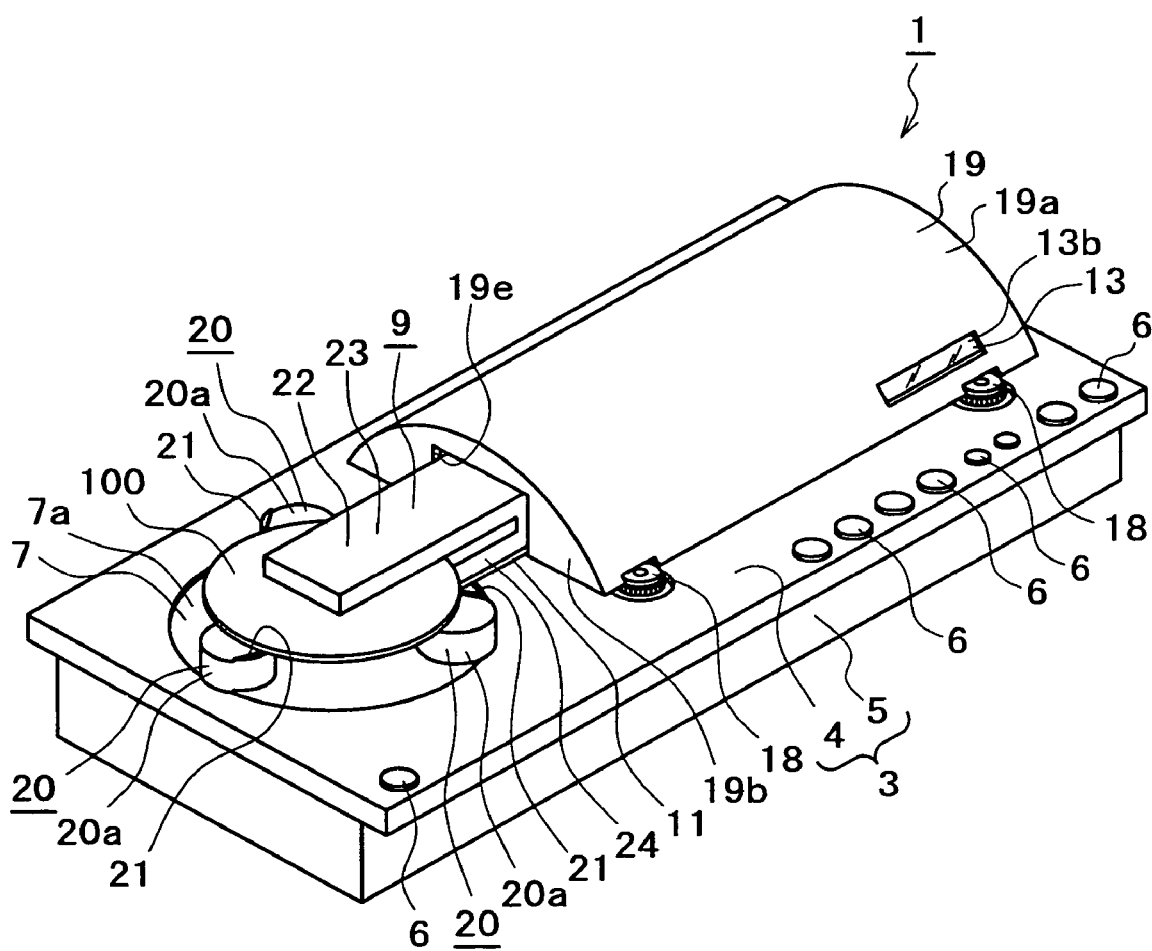
FIG. 20 is a perspective view showing the manner in which the centering of the disk-shaped recording medium is completed and the base unit is withdrawn from a unit housing space when the disk drive device is in operation, with the cover being omitted from illustration.

As the cam slider 36 is moved further forwardly, as shown in FIG. 20, the first lifting/lowering pins 45 move in the slanted sections 39b of the front cam slots 39 and also move further downwardly in the guide holes 35. At this time, the second lifting/lowering pins 46 move from the slanted sections 40b into the acting sections 40c of the rear cam slots 40 and also move further downwardly in the guide holes 35. Consequently, the support arm 42 is moved further downwardly, lowering the chucking pulley 49 to cause the presser member 51c to press the disk-shaped recording medium 100 downwardly.

At this time, the rotary slide knob 51g of the chucking pulley 49 is brought into contact with the lower surface of the holder 52, which presses the chucking pulley 49 against the disk-shaped recording medium 100.

Figure 21:
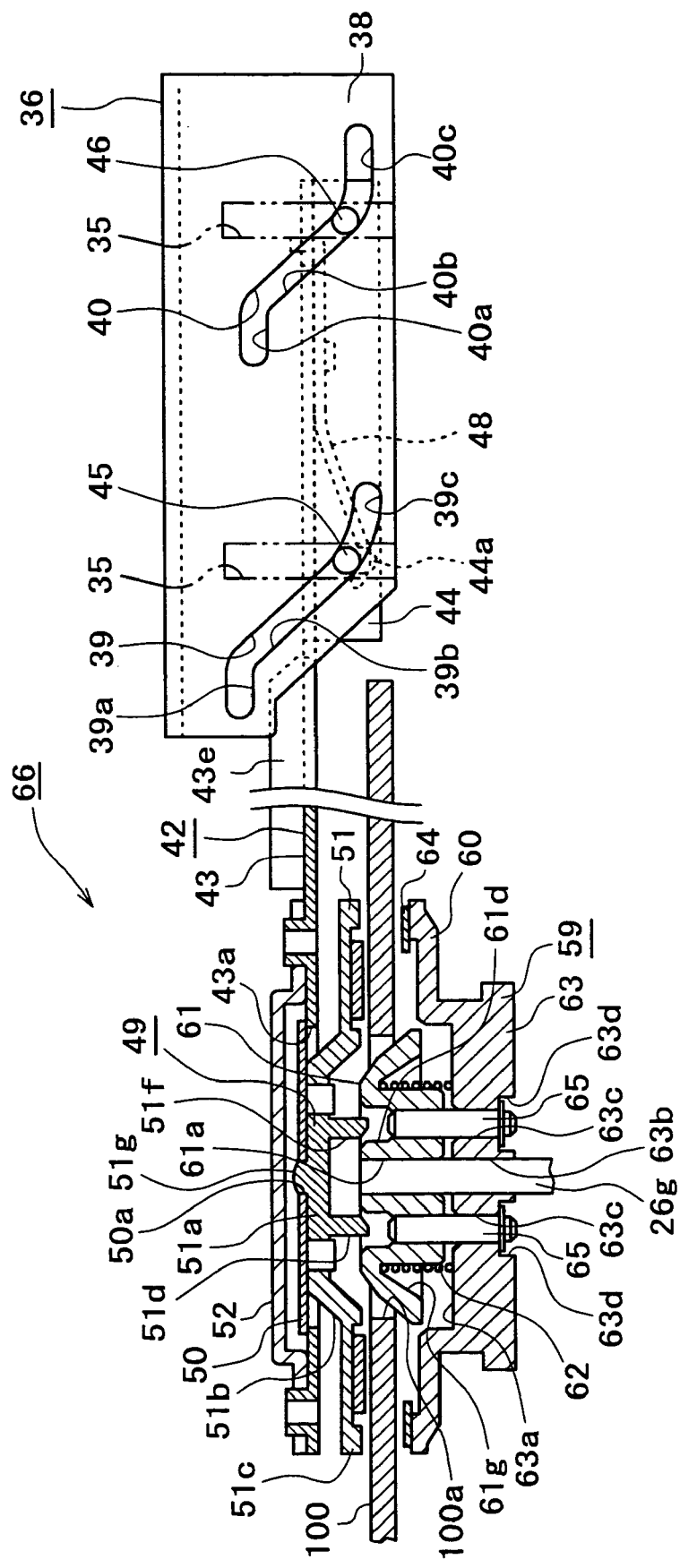
FIG. 21 is a side elevational view, partly in cross section, showing the manner in which a chucking process is being performed by the disk drive device.

When the cam slider 36 is moved further forwardly, as shown in FIG. 21, the first lifting/lowering pins 45 move rearwardly from the slanted sections 39b into the retaining sections 39c of the front cam slots 39 and also move further downwardly in the guide holes 35, until the first lifting/lowering pins 45 reach the acting position at the right ends of the retaining sections 39c. At this time, since the second lifting/lowering pins 46 move in the acting sections 40c of the rear cam slots 40, the second lifting/lowering pins 46 do not move vertically, but stay at rest in the guide holes 35. Accordingly, the first lifting/lowering pins 45 move downwardly in the pin support holes 44a in the arm plates 43 against the bias of the bias spring 48. At this time, the bias spring 48 is elastically deformed, and the support arm 42 and the holder 52 are biased to move downwardly under the resiliency of the bias spring 48.

When the support arm 42 and the holder 52 are biased to move downwardly under the resiliency of the bias spring 48, the force with which the chucking pulley 49 presses the disk-shaped recording medium 100 increases.

Upon arrival of the first and second lifting/lowering pins 45, 46 at the right ends of the retaining sections 39c and the right ends of the lower horizontal sections 40c, the chucking of the disk-shaped recording medium 100 is completed.

Upon completion of the chucking of the disk-shaped recording medium 100, the spindle motor 26 is energized to rotate the disk table 59, the disk-shaped recording medium 100, and the chucking pulley 49 in unison with each other. The optical pickup 27 is also energized to reproduce an information signal recorded on the disk-shaped recording medium 100, for example. The chucking pulley 29 is rotated with the rotary slide knob 51g held against the lower surface of the holder 52.

When the reproduction of the information signal recorded on the disk-shaped recording medium 100 is over, the lifting/lowering motor 55 is reversed to move the cam slider 36 rearwardly, moving the support arm 42 upwardly. Therefore, the disk-shaped recording medium 100 is released from the chucking action by the chucking pulley 49 and the disk table 59. When the disk-shaped recording medium 100 is released from the chucking action, the disk-shaped recording medium 100 is placed on the disk table 59.

Then, the rotors 20 are elevated, causing their upper surfaces 20a to contact the lower surface of the disk-shaped recording medium 100 and lift the disk-shaped recording medium 100. At the same time, the disk centering members 21 are brought into contact with the outer peripheral edge of the disk-shaped recording medium 100. The disk-shaped recording medium 100 is thus lifted upwardly from the table 60 of the disk table 59.

When the disk-shaped recording medium 100 is lifted by the rotors 20, the unit actuator 12 moves the base unit 9, the control board 10, and the support base 11 in unison in the direction indicated by the arrow L2 in FIG. 17 until the base unit 9 is placed back into the unit housing space 8a.

When the base unit 9 is moved rearwardly into the unit housing space 8a, the rotors 20 are lowered while in rotation, placing the disk-shaped recording medium 100 onto the disk mount surface 7a of the recording medium mount 7.

Then, the user presses the open button to move the cover 2 to the open position. The user can now hold and remove the disk-shaped recording medium 100 from the disk drive device 1.

Figure 22:
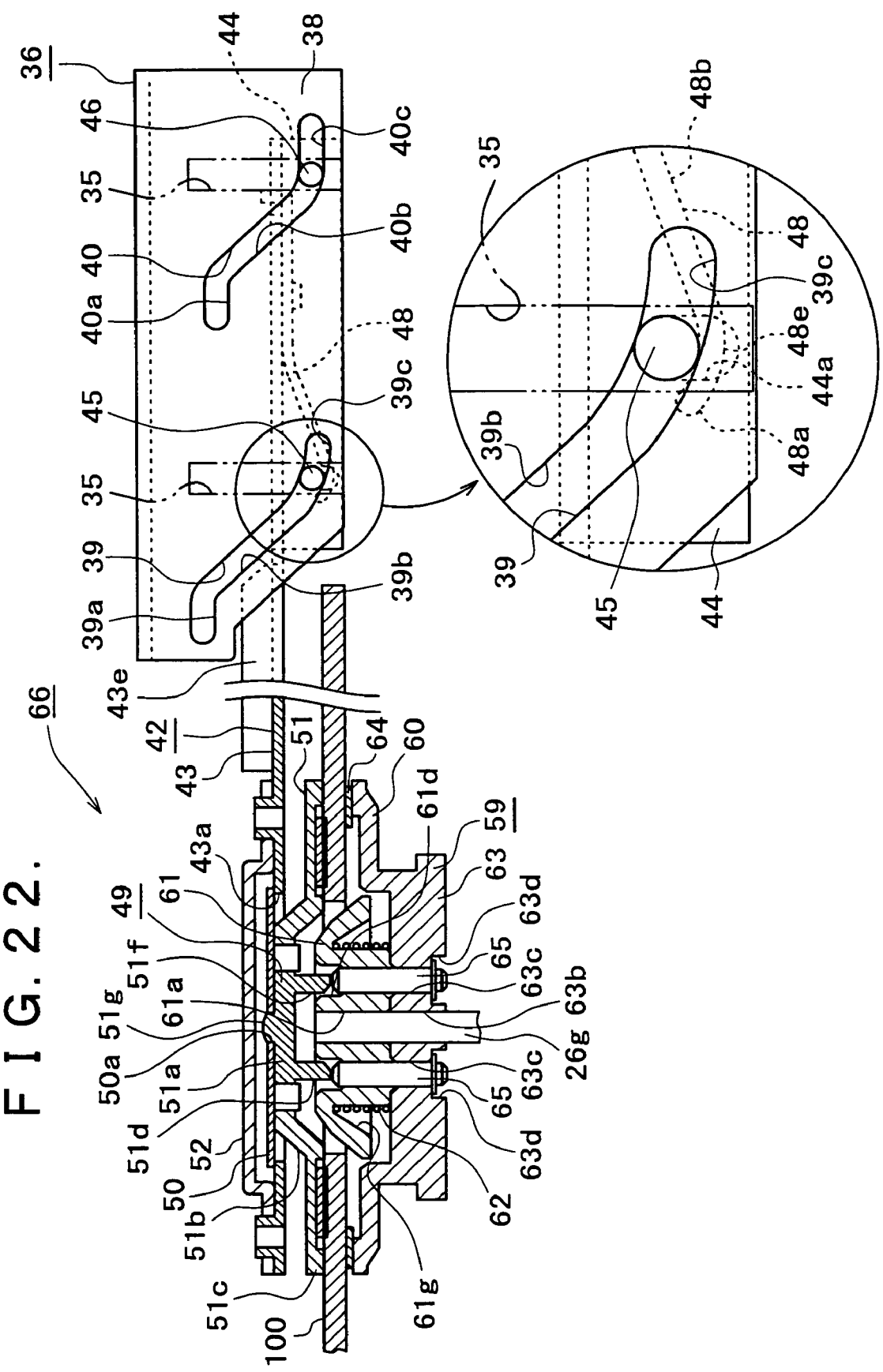
FIG. 22 is a side elevational view, partly in cross section, showing the manner in which the chucking process is being performed by the disk drive device, following the state shown in FIG. 19.
Figure 23:
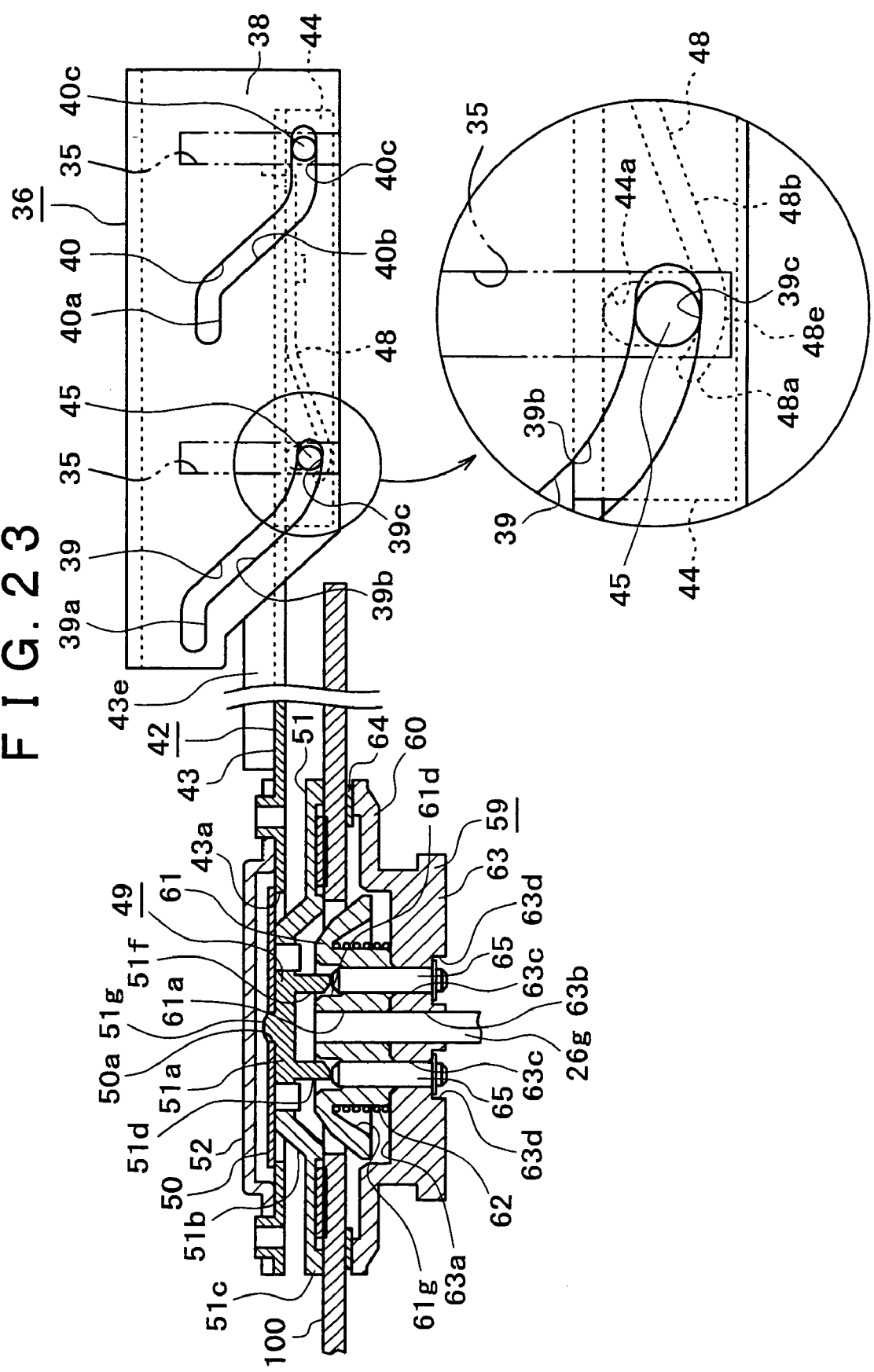
FIG. 23 is a side elevational view, partly in cross section, showing the manner in which the chucking process is completed.
Figure 24:
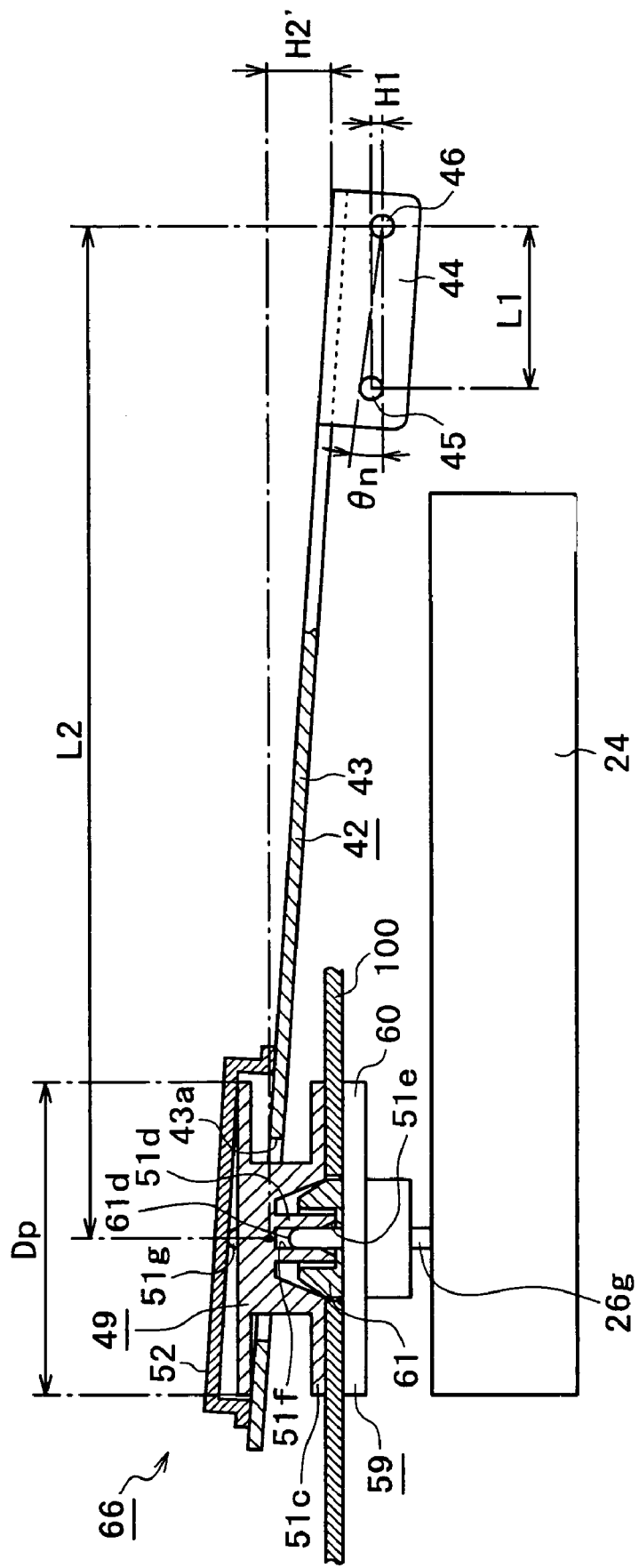
FIG. 24 is a side elevational view, partly in cross section, which is illustrative of the positional accuracy of the support arm.

The positional accuracy of the support arm 42 will be described below with reference to FIG. 22. FIG. 22 shows the support arm 42 as being exaggeratedly inclined in order to explain the positional accuracy of the support arm 42.

It is assumed that the sum of vertical accuracies of the second lifting/lowering pin 46 and the rear cam slot 40 of the cam slider 36 which receives the second lifting/lowering pin 46 is represented by P1, the sum of vertical accuracies of the first lifting/lowering pin 45 and the front cam slot 39 of the cam slider 36 which receives the first lifting/lowering pin 45 by P2, the sum of vertical accuracies of the rotary slide knob 51g of the chucking pulley 49 and the holder 52 engaged by the rotary slide knob 51g by Pcp, the distance between the first lifting/lowering pin 45 and the second lifting/lowering pin 46 by L1, and the distance between the rotary slide knob 51g and the second lifting/lowering pin 46 by L2.

As described above, the support arm 42 and the holder 52 are made of a highly rigid material such as metal or the like, and are biased toward the disk table 59 by the bias spring 48 while the disk-shaped recording medium 100 is being chucked. A reference for the positional accuracy is provided by the rotary slide knob 51g and the second lifting/lowering pin 46, and the vertical accuracy H2' of the support arm 42 at the center of the chucking pulley 49 is given by the following equation:

$$H2' = P1 + Pcp \quad (3)$$

Figure 25:
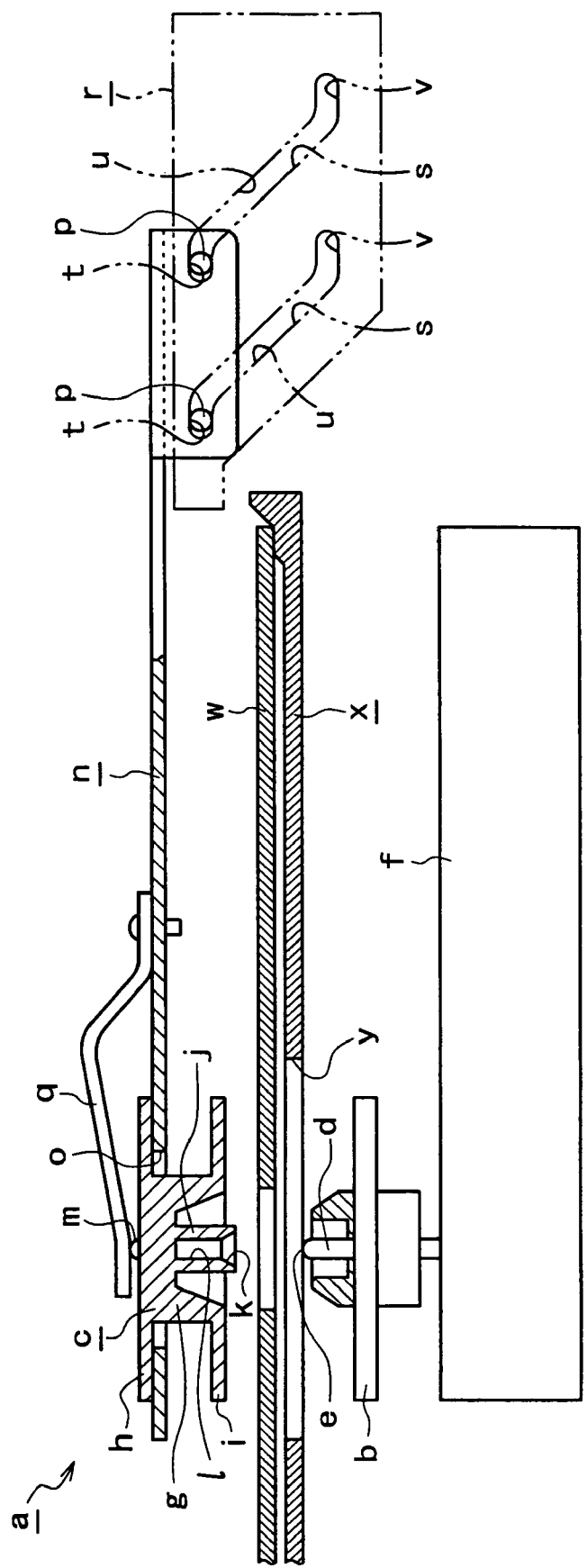
FIG. 25 is a side elevational view, partly in cross section, of a conventional disk chucking mechanism, showing the position of components before a disk-shaped recording medium is chucked.
Figure 26:
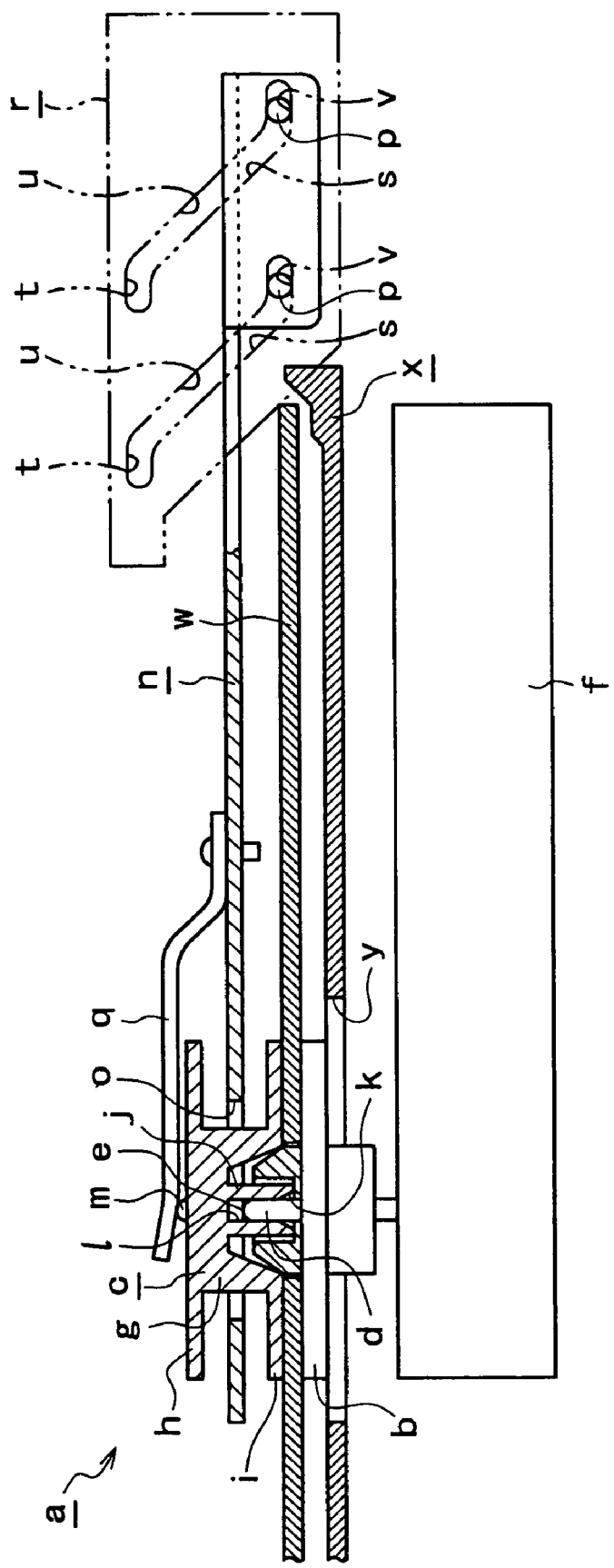
FIG. 26 is a side elevational view, partly in cross section, of the conventional disk chucking mechanism, showing the position of components when the disk-shaped recording medium is chucked.
Figure 27:
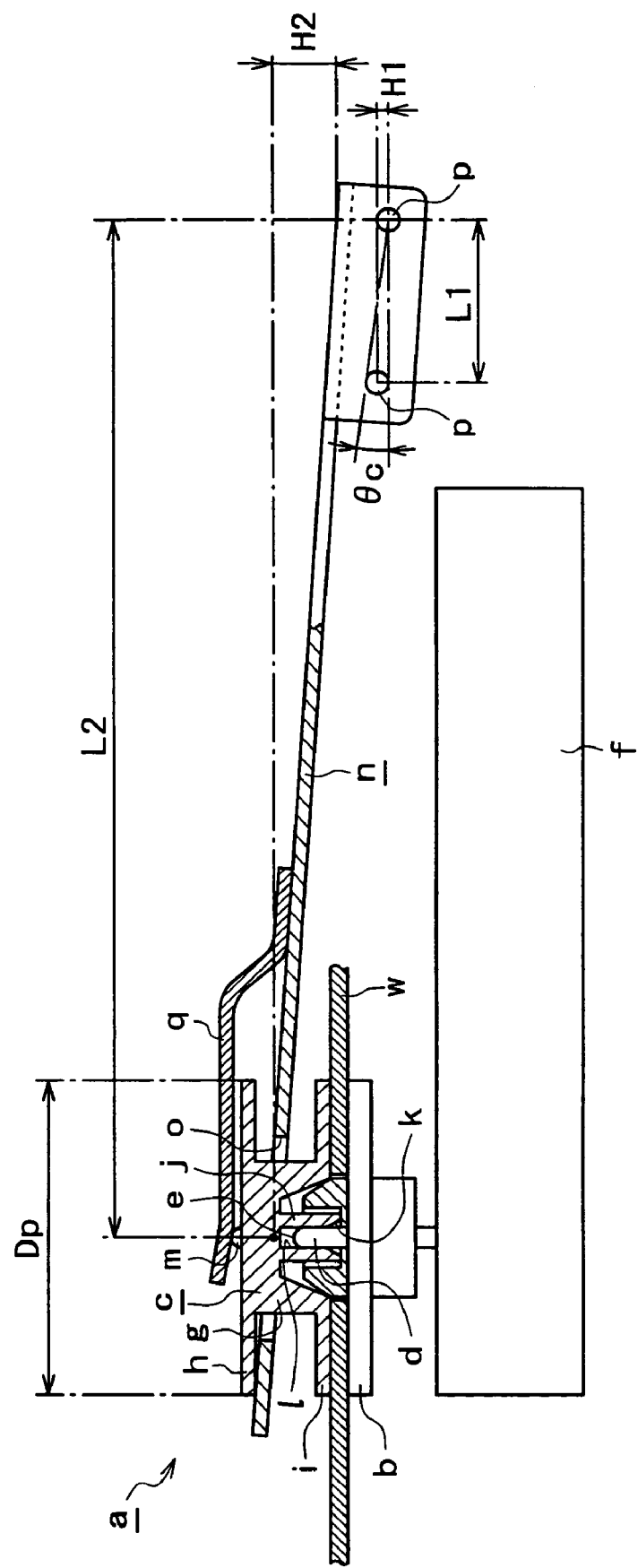
FIG. 27 is a side elevational view, partly in cross section, which is illustrative of the positional accuracy of a support arm of the conventional disk chucking mechanism.
Figure 28:
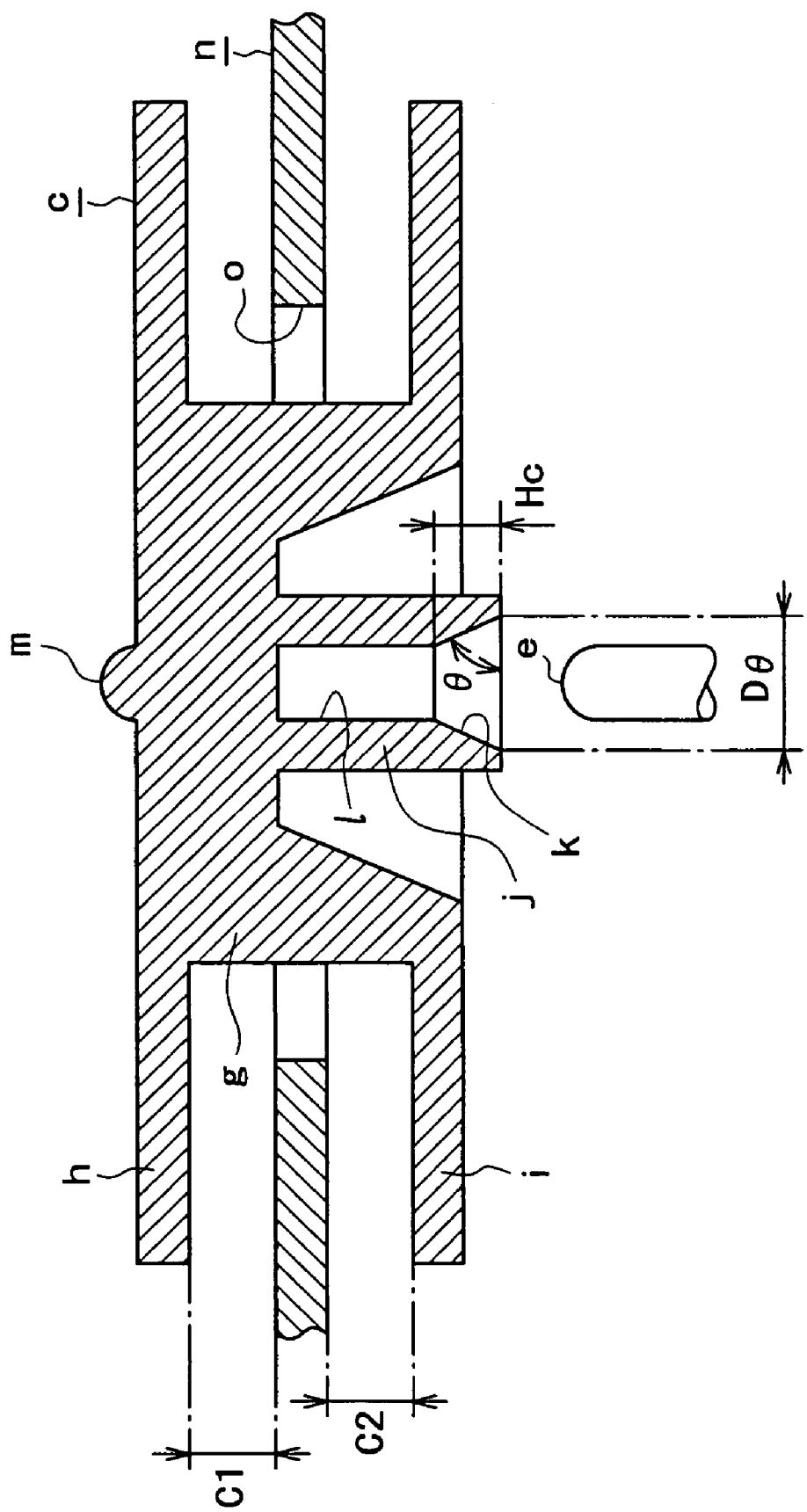
FIG. 28 is an enlarged cross-sectional view which is illustrative of the relationship between the size of a support hole defined in the support arm and the thickness of the conventional disk chucking mechanism.

If the equation (3) is compared with the equation (1) of $H2 = (P1+P2) \times L2/L1$ for the conventional chucking mechanism a described above with reference to FIG. 25, then since $$Pcp \leq P2 \text{ and } L2/L1 \gg 1,$$

$$H2 \gg H2'.$$

The angular accuracy of the support arm 42 will be described below.

If the support arm 42 is inclined an angle θn to the horizontal plane, then the angle θn is expressed as Tan θn=H2'/L2. If the chucking pulley 49 has a diameter Dp, then a displacement Δh' of the chucking pulley 49 at its central position is given by the following equation:

$$\Delta h' = \text{Tan } \theta n \times Dp/2 = H2' \times Dp/2L2 = (P1+Pcp) \times Dp/2L2 \quad (4)$$

If the equation (4) is compared with the equation (2) of $\Delta h = Dp/2 \cdot \text{Tan } \theta c = H1 \times Dp/2L1 = (P1+P2) \times Dp/2L1$ for the conventional chucking mechanism a described above with reference to FIG. 25, then since $$Pcp \leq P2 \text{ and } L2 \gg L1,$$

$$\Delta h \gg \Delta h'.$$

Therefore, as described above, since the first lifting/lowering pins 45 held in the acting position elastically deform the bias spring 48 to bias the support arm 42 and the holder 52 to move toward the disk table 59, the support arm 42 has its positionally accuracy greatly increased, and the disk drive device 1 can be constructed in a low-profile configuration.

In the disk drive device 1, the upper case 23 has the limit pin 25 inserted in the limit hole 43c defined in the support arm 42 for preventing the support arm 42 from wobbling laterally. Consequently, when the positioning protrusion 61d of the disk table 59 is inserted into the positioning tube 51d of the chucking pulley 49, any positional misalignment between the center of the disk table 59 and the center of the chucking pulley 49 is reduced. As the introducing range Dθ of the positioning tube 51d is reduced, the length of the positioning tube 51d is also reduced, making the disk drive device 1 lower in profile accordingly.

In the above embodiment, the upper case 23 has the limit pin 25 and the support arm 42 has the limit hole 43c for preventing the support arm 42 from wobbling laterally. However, the upper case 23 may have a limit hole and the support arm 42 may have a limit pin inserted in the limit hole for thereby preventing the support arm 42 from wobbling laterally.

Alternatively, the lower case 48, rather than the upper case 23, may have a limit pin or a limit hole, and the support arm 42 may have a limit hole or a limit pin.

Although a certain preferred embodiment of the present invention has been shown and described in detail, it should be understood that various changes and modifications may be made therein without departing from the scope of the appended claims.

What is claimed is:

1. A disk chucking mechanism comprising:
   a spindle motor having a motor shaft;
   a disk table fixed to said motor shaft of the spindle motor for rotation in response to energization of said spindle motor;
   a chucking pulley for clamping and chucking a disk-shaped recording medium in coaction with said disk table, said chucking pulley having a rotary slide knob projecting away from said disk table;
   a support arm extending in a direction perpendicular to an axial direction of said chucking pulley, said chucking pulley being rotatably supported on an end of said support arm in a longitudinal direction thereof;
   a first lifting/lowering pin and a second lifting/lowering pin which are mounted on an opposite end portion of said support arm and spaced from each other in said longitudinal direction;
   a holder fixedly mounted on said support arm for pressing said chucking pulley toward said disk table while being held in contact with a distal end of said rotary slide knob when said disk-shaped recording medium is in rotation;
   a bias spring having a portion mounted on said support arm and another portion resiliently held against said first lifting/lowering pin; and
   a moving mechanism configured to move said chucking pulley toward and away from said disk table, said first lifting/lowering pin and said second lifting/lowering pin being movably supported by said moving mechanism;
   wherein said moving mechanism has a retainer for retaining said first lifting/lowering pin in an acting position when the disk-shaped recording medium is chucked; and
   wherein said first lifting/lowering pin retained in the acting position by said retainer elastically deforms said bias spring to bias said support arm and said holder to move toward said disk table.

2. A disk chucking mechanism comprising:
   a casing having a spindle motor mounted therein and having a motor shaft;
   a disk table fixed to said motor shaft of the spindle motor for rotation in response to energization of said spindle motor, said disk table having a positioning protrusion centrally thereon;
   a chucking pulley for clamping and chucking a disk-shaped recording medium in coaction with said disk table, said chucking pulley having a positioning tube for receiving said positioning protrusion inserted therein;
   a support arm extending in a direction perpendicular to an axial direction of said chucking pulley, said chucking pulley being rotatably supported on said support arm; and
   a moving mechanism configured to move said chucking pulley toward and away from said disk table, said support arm being movably supported by said moving mechanism;
   wherein said support arm has a through hole limit element; and
   wherein said casing has a limit member for limiting said limit element and configured to prevent said support arm from moving in a direction perpendicular to the axial direction of said chucking pulley and perpendicular to a longitudinal direction of said support arm.

3. A disk drive device having a spindle motor having a motor shaft, a disk table fixed to said motor shaft of the spindle motor for rotation in response to energization of said spindle motor, and a chucking pulley for clamping and chucking a disk-shaped recording medium in coaction with said disk table, said chucking pulley having a rotary slide knob projecting away from said disk table, wherein an information signal is recorded on and reproduced from the disk-shaped recording medium which is chucked by said disk table and said chucking pulley, said disk drive device comprising:
   a support arm extending in a direction perpendicular to an axial direction of said chucking pulley, said chucking pulley being rotatably supported on an end of said support arm in a longitudinal direction thereof;
   a first lifting/lowering pin and a second lifting/lowering pin which are mounted on an opposite end portion of said support arm and spaced from each other in said longitudinal direction;
   a holder fixedly mounted on said support arm for pressing said chucking pulley toward said disk table while being held in contact with a distal end of said rotary slide knob when said disk-shaped recording medium is in rotation;
   a bias spring having a portion mounted on said support arm and another portion resiliently held against said first lifting/lowering pin; and
   a moving mechanism configured to move said chucking pulley toward and away from said disk table, said first lifting/lowering pin and said second lifting/lowering pin being movably supported by said moving mechanism;
   wherein said moving mechanism has a retainer for retaining said first lifting/lowering pin in an acting position when the disk-shaped recording medium is chucked; and wherein said first lifting/lowering pin retained in the acting position by said retainer elastically deforms said bias spring to bias said support arm and said holder to move toward said disk table.

4. A disk drive device having a casing having a spindle motor mounted therein and having a motor shaft, a disk table fixed to said motor shaft of the spindle motor for rotation in response to energization of said spindle motor, said disk table having a positioning protrusion centrally thereon, and a chucking pulley for clamping and chucking a disk-shaped recording medium in coaction with said disk table, said chucking pulley having a positioning tube for receiving said positioning protrusion inserted therein, wherein an information signal is recorded on and reproduced from the disk-shaped recording medium which is chucked by said disk table and said chucking pulley, said disk drive device comprising:

a support arm extending in a direction perpendicular to an axial direction of said chucking pulley, said chucking pulley being rotatably supported on said support arm; and a moving mechanism configured to move said chucking pulley toward and away from said disk table, said support arm being movably supported by said moving mechanism;

wherein said support arm has a through hole limit element; and wherein said casing has a limit member for limiting said limit element and configured to prevent said support arm from moving in a direction perpendicular to the axial direction of said chucking pulley and perpendicular to a longitudinal direction of said support arm.

* * * * *

UNITED STATES PATENT AND TRADEMARK OFFICE
CERTIFICATE OF CORRECTION

PATENT NO. : 7,249,362 B2  Page 1 of 1
APPLICATION NO. : 10/930768
DATED : July 24, 2007
INVENTOR(S) : Yasuo Osada It is certified that error appears in the above-identified patent and that said Letters Patent is hereby corrected as shown below:

Column 1, line 53, change numeral "1" to lower case --l--.

Column 4, line 35, change numeral "1" to lower case --l--.

Column 4, line 39, change numeral "1" to lower case --l--.

Column 4, line 47, change numeral "1" to lower case --l--.

Column 15, line 44, change "0.26g" to --26g--.

Signed and Sealed this

Twenty-ninth Day of April, 2008

JON W. DUDAS
*Director of the United States Patent and Trademark Office*